United States Patent [19]
Inagaki et al.

[11] Patent Number: 5,362,934
[45] Date of Patent: Nov. 8, 1994

[54] PUSH-BUTTON SWITCH, KEYTOP, AND METHOD OF MANUFACTURING THE KEYTOP

[75] Inventors: Jiroh Inagaki, Tokyo; Atsushi Hari, Kanagawa; Nobuyuki Yagi, Tokyo; Yasutoshi Kaku, Kanagawa; Takashi Shinoki, Tokyo, all of Japan

[73] Assignee: Teikoku Tsushin Kogyo Co., Ltd., Tokyo, Japan

[21] Appl. No.: 46,843

[22] Filed: Apr. 14, 1993

Related U.S. Application Data

[62] Division of Ser. No. 784,000, Oct. 29, 1991, Pat. No. 5,280,146.

[30] Foreign Application Priority Data

| Oct. 30, 1990 | [JP] | Japan | 2-113602 |
|---|---|---|---|
| Nov. 5, 1990 | [JP] | Japan | 2-299541 |
| Apr. 8, 1991 | [JP] | Japan | 3-103171 |
| Apr. 8, 1991 | [JP] | Japan | 3-103172 |
| Apr. 8, 1991 | [JP] | Japan | 1-103173 |
| Apr. 30, 1991 | [JP] | Japan | 3-126765 |

[51] Int. Cl.5 .......................................... H01H 13/14
[52] U.S. Cl. .................................. 200/520; 200/302.2; 200/345
[58] Field of Search ................... 200/517, 520, 302.1, 200/302.2, 302.3, 345, 341

[56] References Cited

U.S. PATENT DOCUMENTS

| 4,471,189 | 9/1984 | Bacon et al. | 200/302.2 |
|---|---|---|---|
| 4,794,215 | 12/1988 | Sawada et al. | 200/345 |
| 4,997,998 | 3/1991 | Bauer | 200/345 |
| 5,150,913 | 9/1992 | Hoelzl | 200/302.2 |

*Primary Examiner*—Glenn T. Barrett
*Attorney, Agent, or Firm*—Wenderoth, Lind & Ponack

[57] ABSTRACT

The keytop of a push-button switch includes a keytop portion situated on the top of a resin film, and a retaining portion situated on the underside of the resin film. The keytop portion and retaining portion are formed into a unitary body by a resin-molding process in which resin is passed through a hole provided in the resin film such that the resin film is sandwiched between the keytop portion and the retaining portion. In another embodiment, the retaining portion is loop-shaped and is formed into a unitary body with the keytop portion by a resin-molding process in which the resin passes through a plurality of holes provided in the resin film in a pattern corresponding to the loop-shaped circumference of the retaining portion. The resin film is sandwiched in a water-tight state between the keytop portion and the loop-shaped retaining portion.

2 Claims, 24 Drawing Sheets

PUSH-BUTTON SWITCH, KEYTOP, AND METHOD OF MANUFACTURING THE KEYTOP

This is a divisional application of Ser. No. 07/784,000, filed Oct. 29, 1991 now U.S. Pat. No. 5,280,146.

BACKGROUND OF THE INVENTION

1. Field of the Invention

This invention relates to the keytop of a push-button switch, a method of manufacturing the keytop, and the push-button switch which uses the keytop.

2. Description of the Prior Art

The reduction in the size of electronic devices that has been achieved in recent years has been accompanied by a demand to reduce the size and thickness also of the push-button switches used on the control panels of these devices. In addition, electronic devices often are used in a variety of environments, and there is a need for a push-button switch having a so-called drip-proof structure, namely a structure which prevents humidity and moisture from penetrating into the contact portion of the switch from the outside.

The conventional keytop of the push-button switch of this type has a complicated structure, has a large number of component parts and possesses a hinge mechanism of a prescribed length. Consequently, such a keytop does not lend itself to a reduction in size and thickness. In addition, a keytop of this kind is not well suited for use in a switch having the aforementioned drip-proof structure which prevents external humidity and moisture from invading the contact portion through the keytop.

SUMMARY OF THE INVENTION

The present invention has been devised in view of the foregoing points and its object is to provide a keytop to which the small size and thickness of a push-button switch can be attributed as well as a method of manufacturing such a keytop.

Another object of the present invention is to provide an outstanding push-button switch having a drip-proof structure in which the penetration of humidity and moisture from the keytop can be prevented, the number of component parts is few and which lends itself to a reduction in size and thickness, as well as keytop of this push-button switch and a method of manufacturing the keytop.

According to the present invention, there is provided a keytop of a push-button switch, in which a keytop portion is situated on the top of a resin film at a prescribed position thereof, a retaining portion is situated on the underside of the resin film at a prescribed position thereof, the keytop portion and the retaining portion are integrated through a portion of the keytop passing through a hole provided in the resin film and are formed by resin-molding, and the resin film is sandwiched between the keytop portion and the retaining portion.

The retaining portion has the shape of a loop, the keytop portion and loop-shaped retaining portion are formed integrally by resin-molding, and the resin film is water-tightly sandwiched between the keytop portion and the loop-shaped retaining portion.

In another aspect of the invention, there is provided a keytop of a push-button switch in which a loop-shaped, drip-proof frame is resin-molded to be formed in a liquid-tight state with a resin film so as to surround a predetermined area of the resin film, a keytop portion is situated on a top side of the resin film within the loop-shaped, drip-proof frame at a prescribed position, a retaining portion is situated on an underside of the resin film within the loop-shaped, drip-proof frame at a prescribed position, the keytop portion and the retaining portion are formed integrally by resin-molding, and the resin film is water-tightly sandwiched between the keytop portion and the retaining portion.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 1(A) through 1(C) are diagrams illustrating a first embodiment of the structure of a keytop of a push-button switch according to the present invention, in which FIG. 1(A) is a plan view, FIG. 1(B) a sectional view taken along line 1(B)—1(B) of FIG. 1(A), and FIG. 1(C) a bottom view;

FIGS. 11(A) through 11(D) are diagrams illustrating a second embodiment of the structure of a keytop of a push-button switch according to the present invention, in which FIG. 11(A) is a plan view, FIG. 11(B) a sectional view taken along line 11(B)—11(B) of FIG. 11(A), FIG. 11(C) a bottom view, and FIG. 11(D) is a plan view of a resin film provided with holes;

FIGS. 12(A) through 12(C) are diagrams illustrating a third embodiment of the structure of a keytop of a push-button switch according to the present invention, in which FIG. 12(A) is a plan view, FIG. 12(B) a sectional view taken along line 12(B)–12(B) of FIG. 12(A), and FIG. 11(C) a bottom view;

Figure 17A:
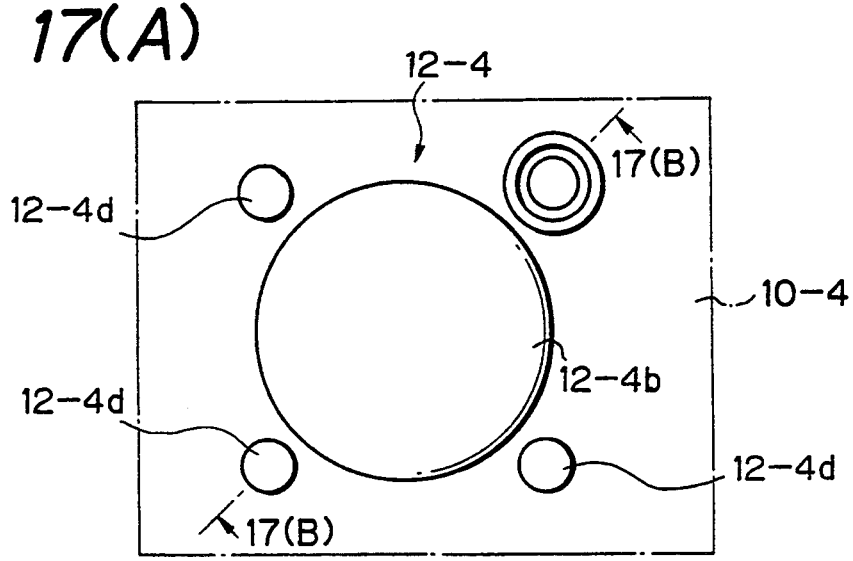
FIGS. 17(A) through 17(C) are diagrams illustrating another structure of a keytop of a push-button switch according to the present invention, in which FIG.
Figure 17B:
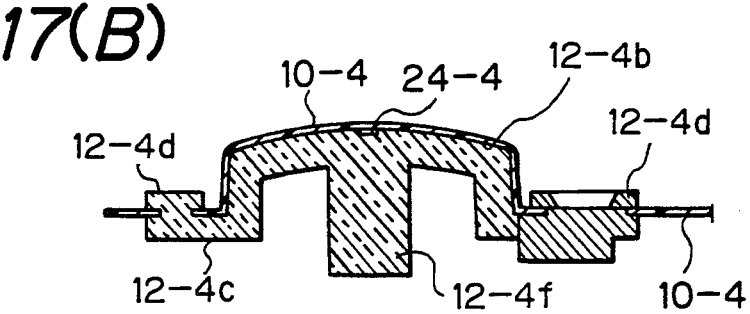
Figure 17C:
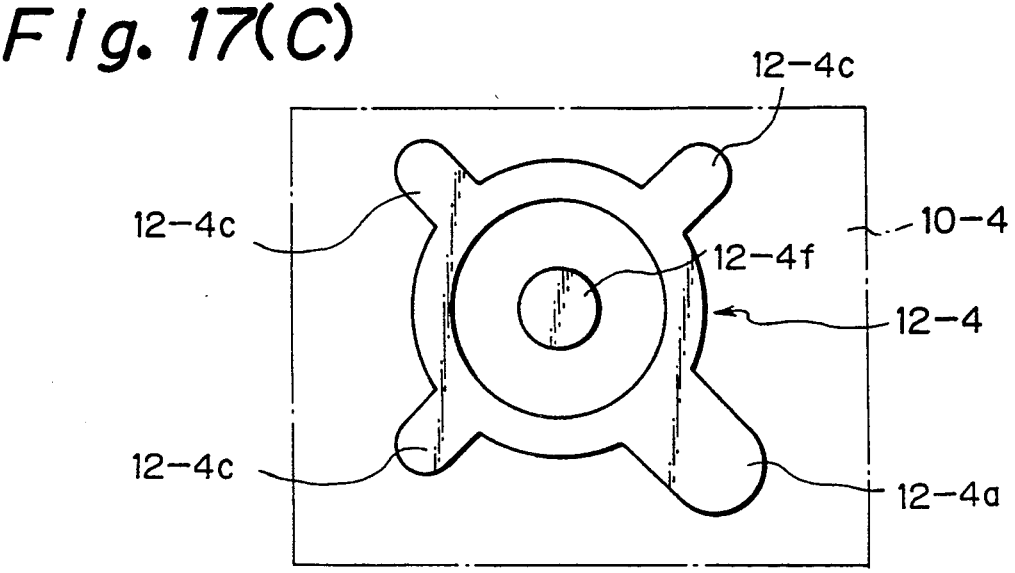
Figure 18:
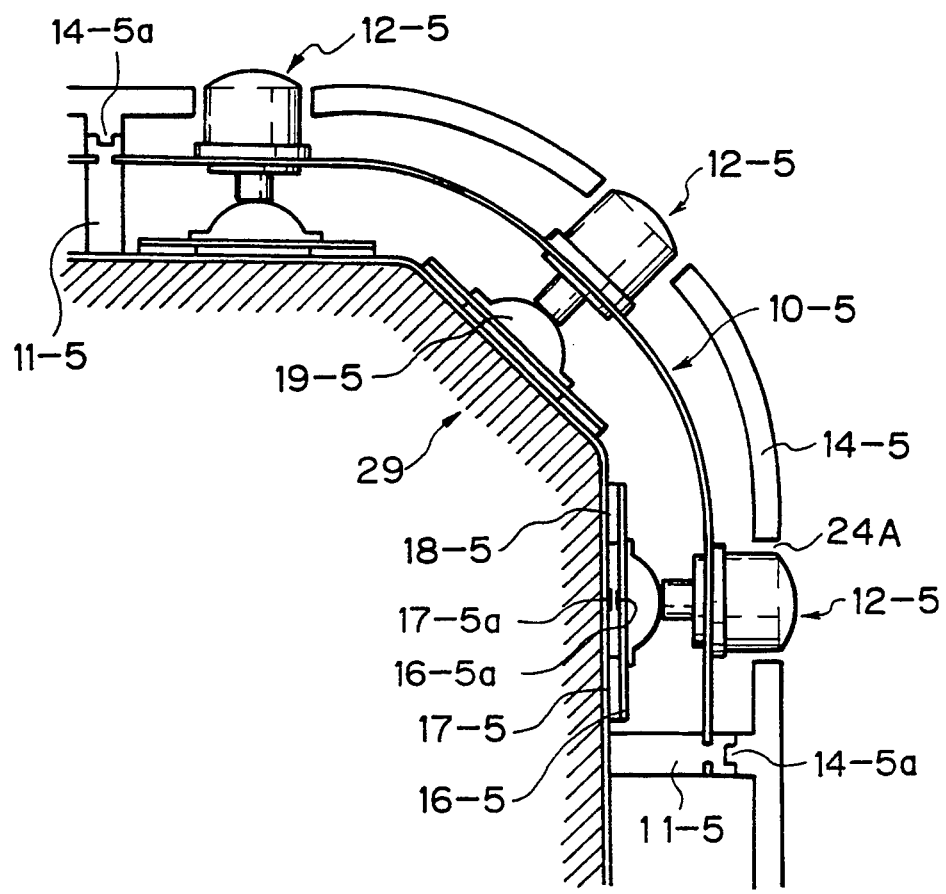
Figure 19:
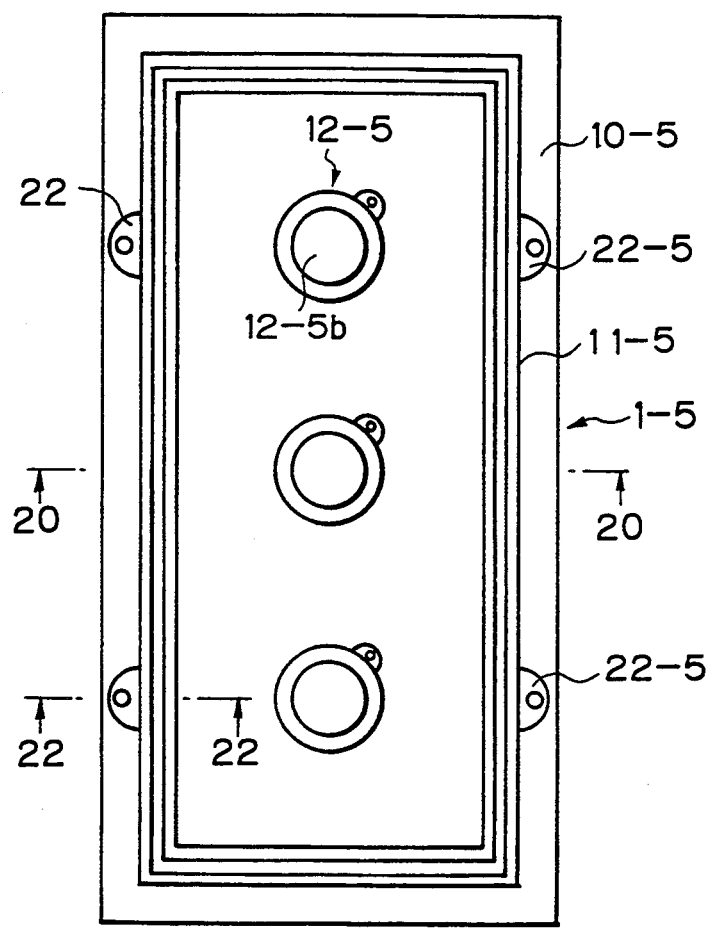
Figure 20:
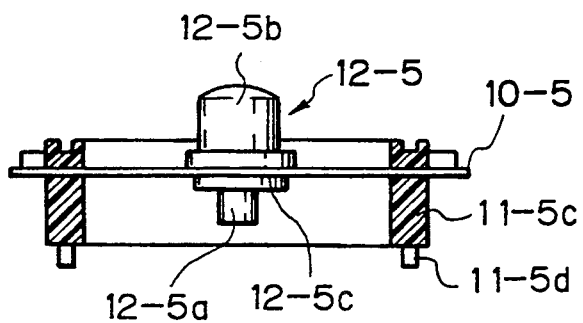
Figure 21:
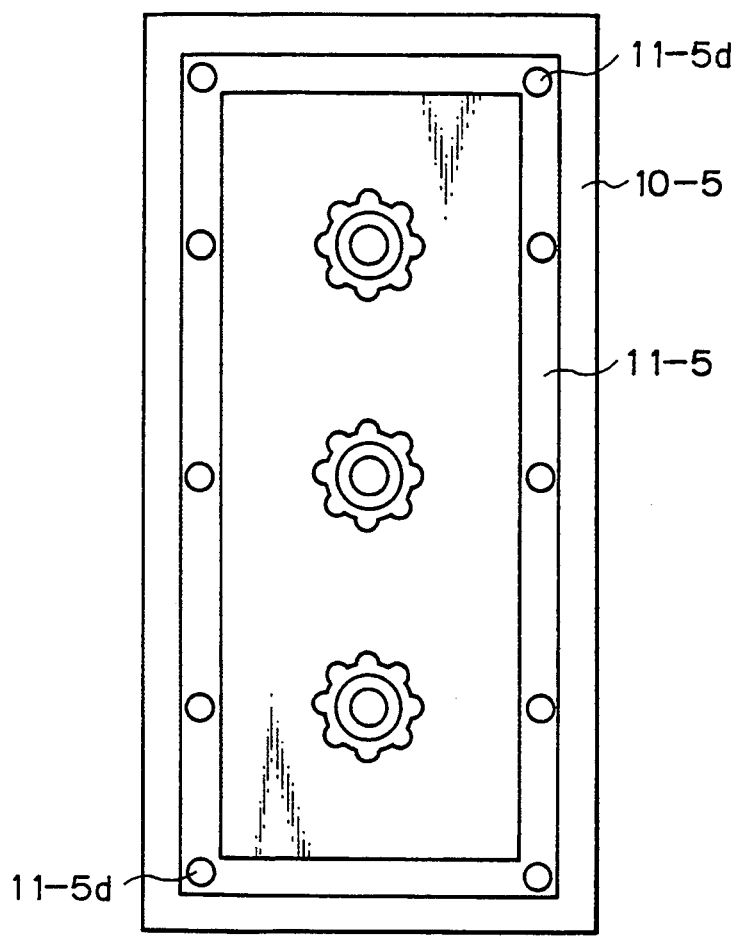
Figure 22:
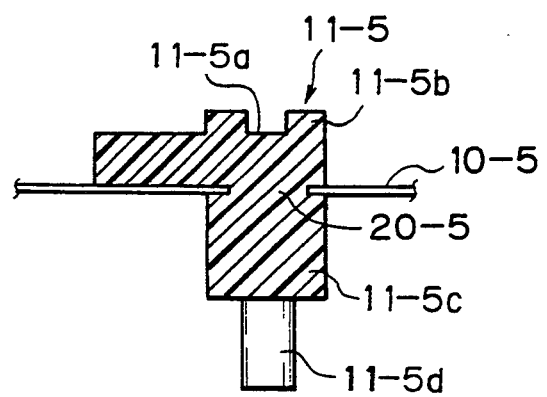
Figure 23A:
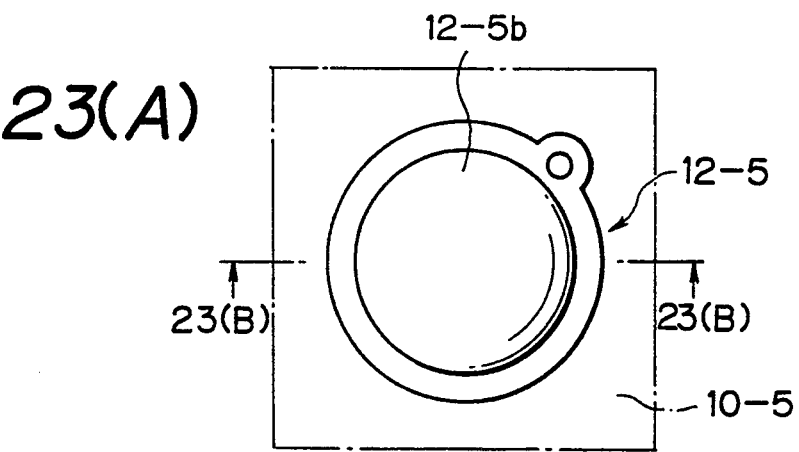
Figure 23B:
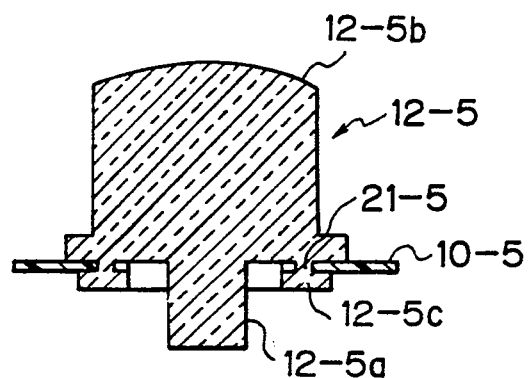
Figure 23C:
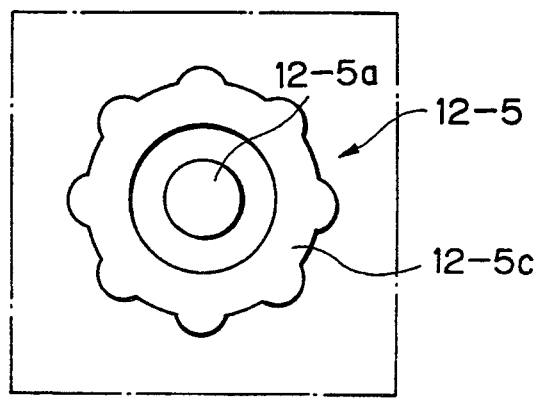
Figure 24:
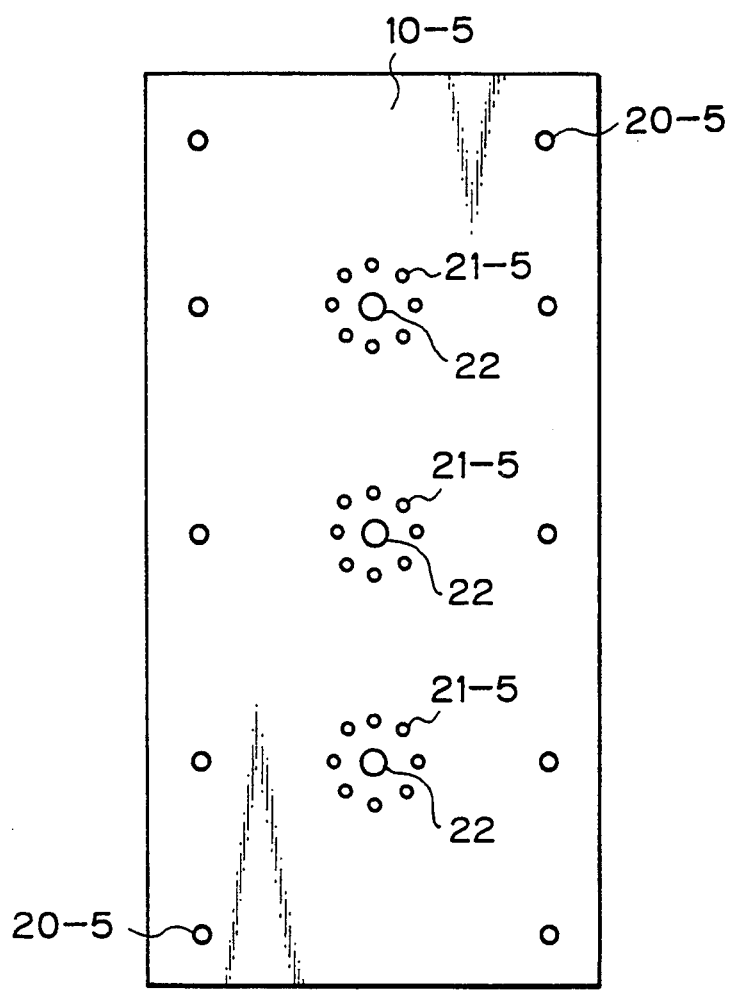
Figure 25:
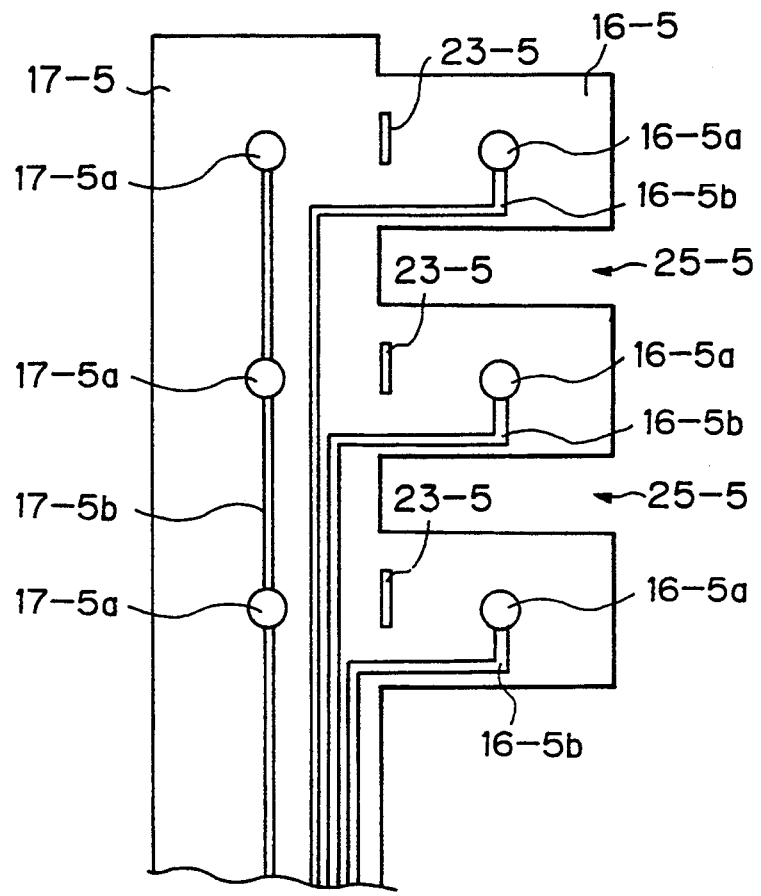
Figure 26:
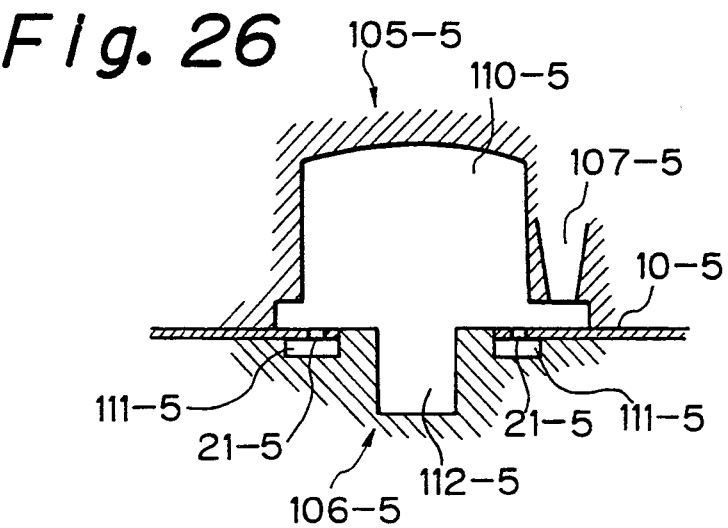
Figure 27:
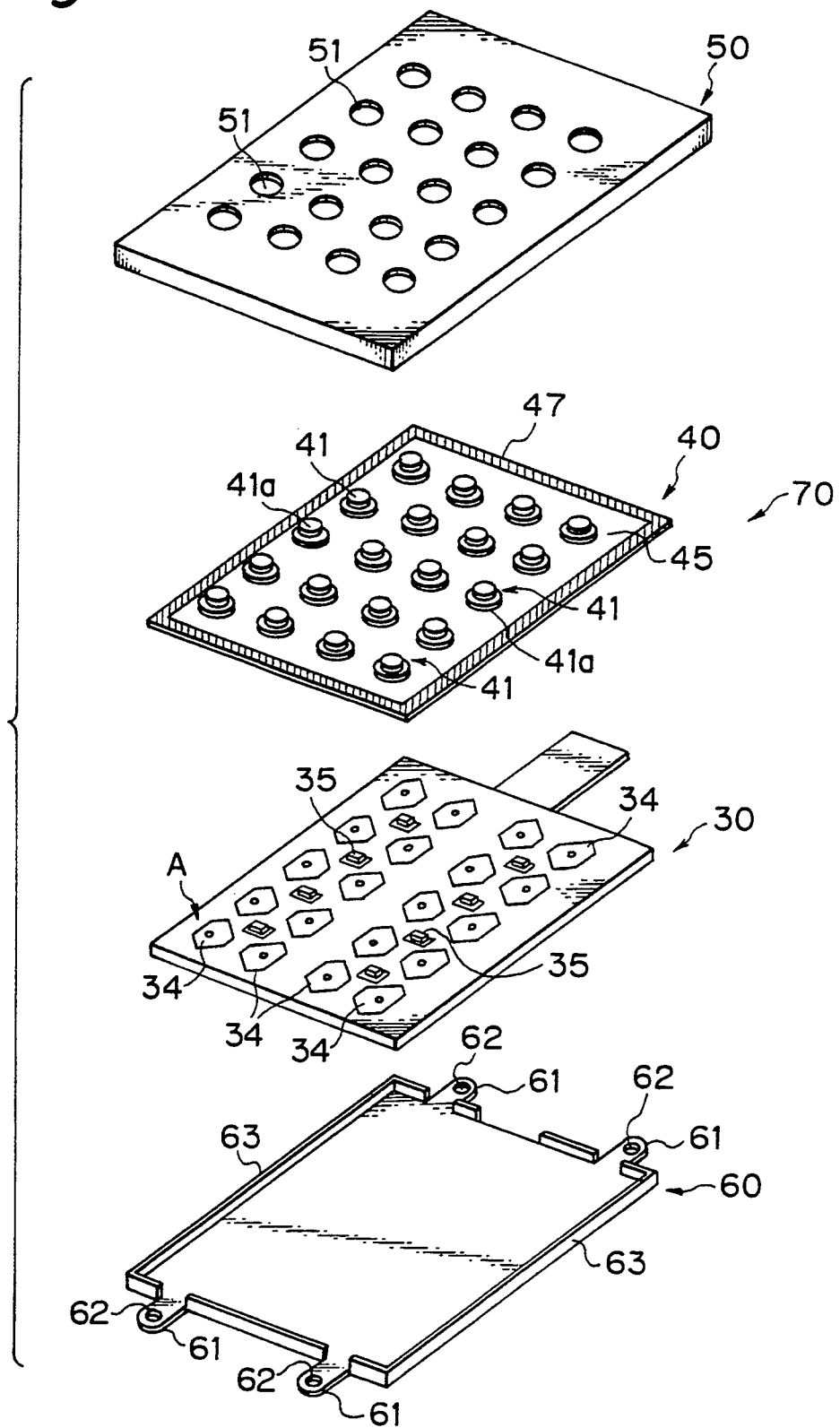
Figure 28:
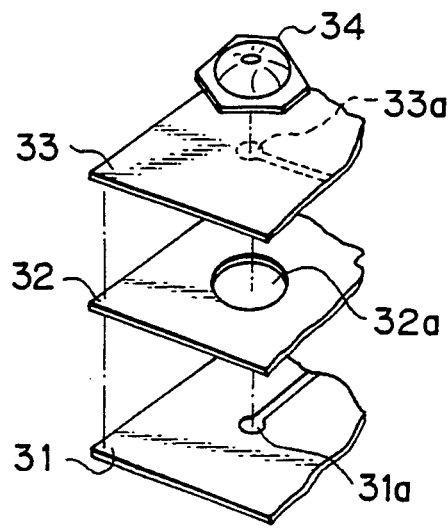
Figure 29:
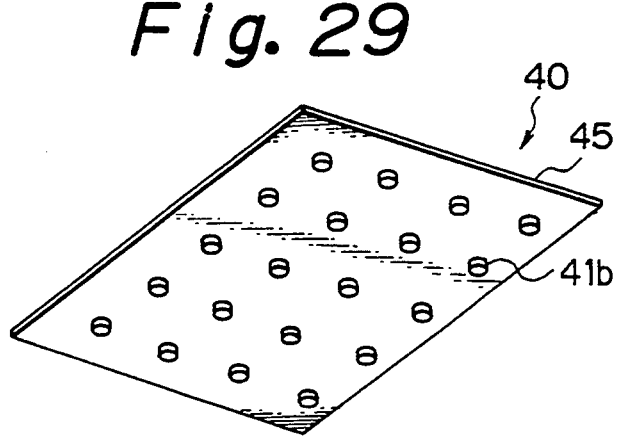
Figure 30:
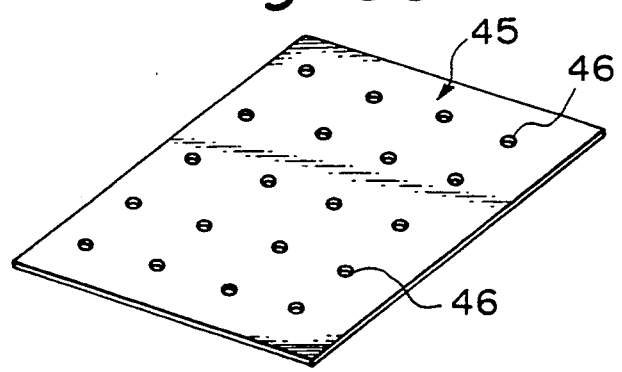
Figure 31A:
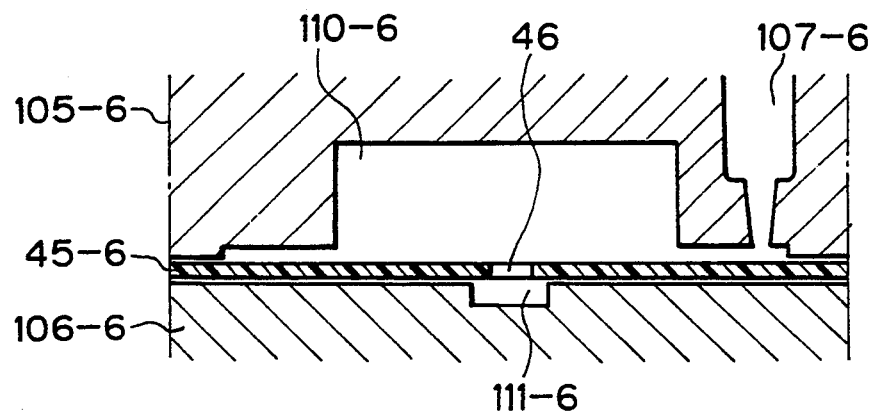
Figure 31B:
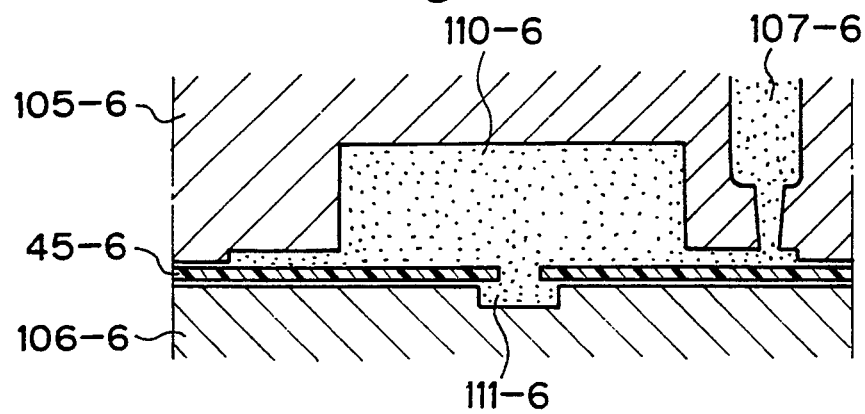
Figure 31C:
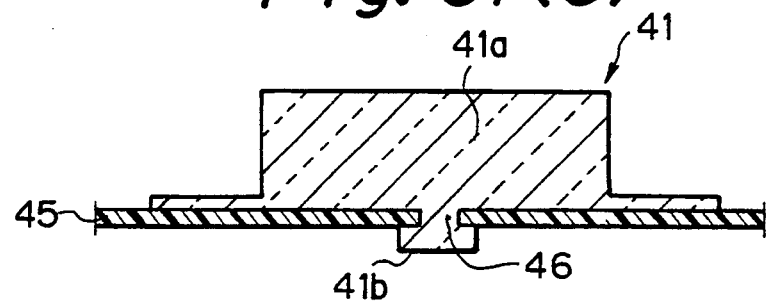
Figure 32:
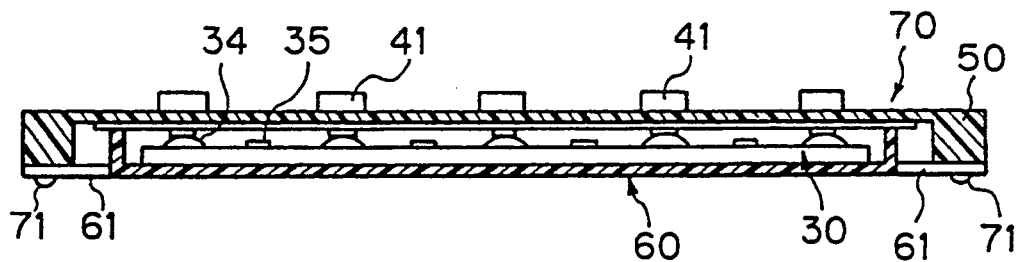
Figure 33:
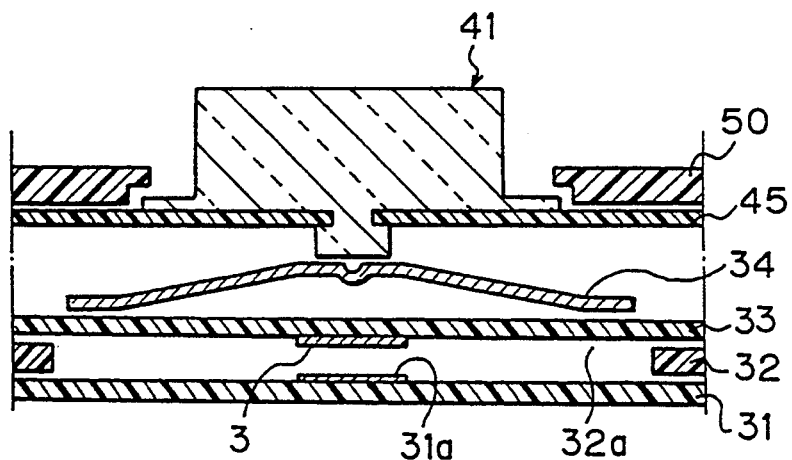
Figure 34:
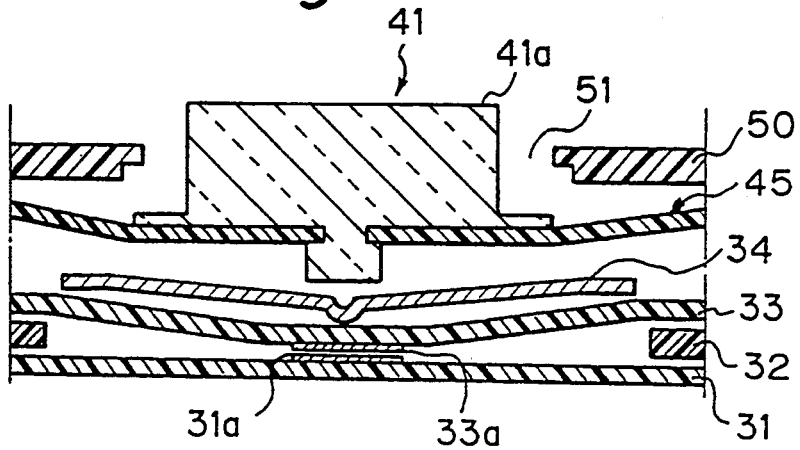
Figure 35:
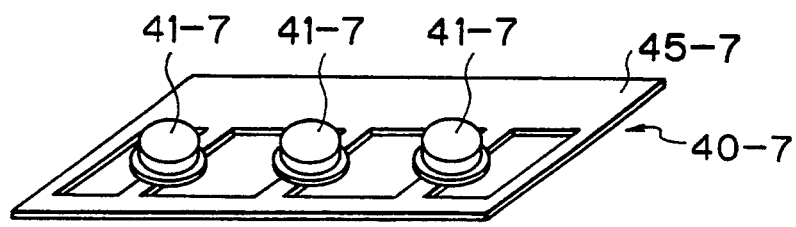
Figure 36A:
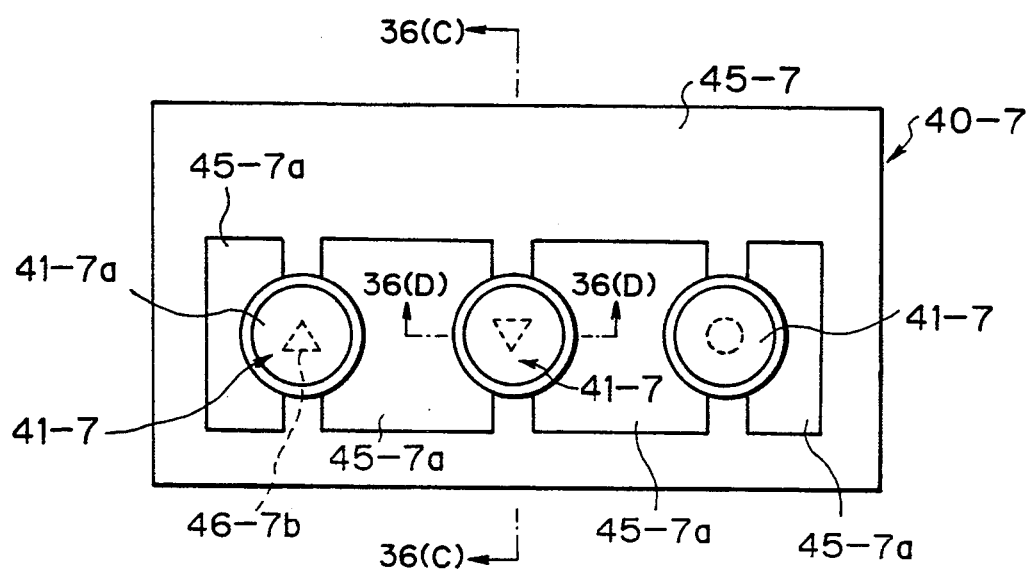
Figure 36B:
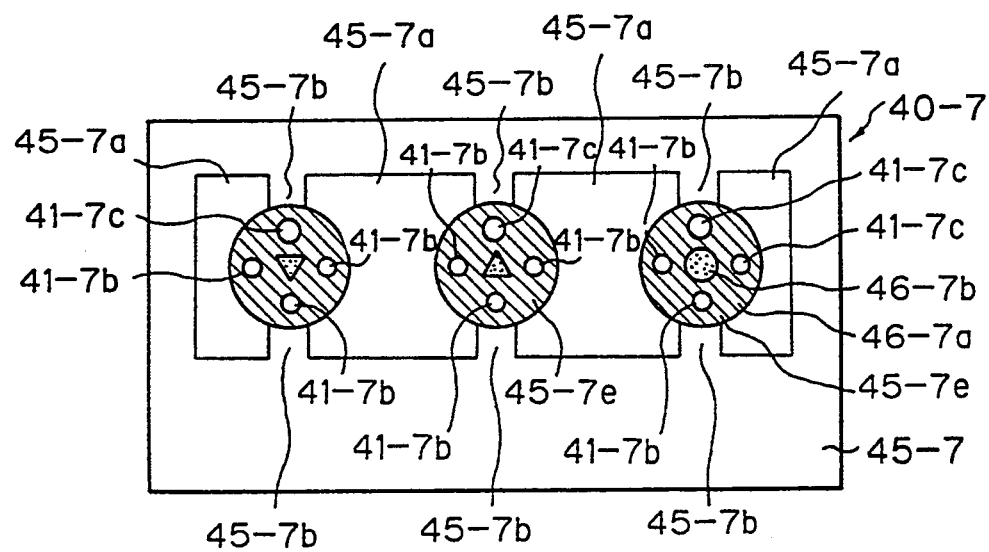
Figure 36C:
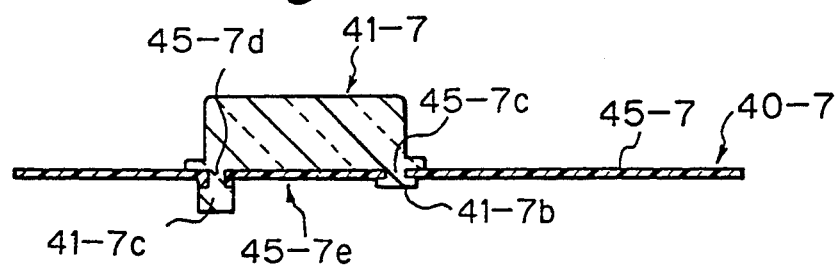
Figure 36D:
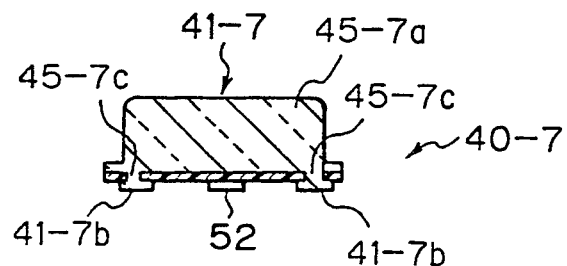
Figure 37A:
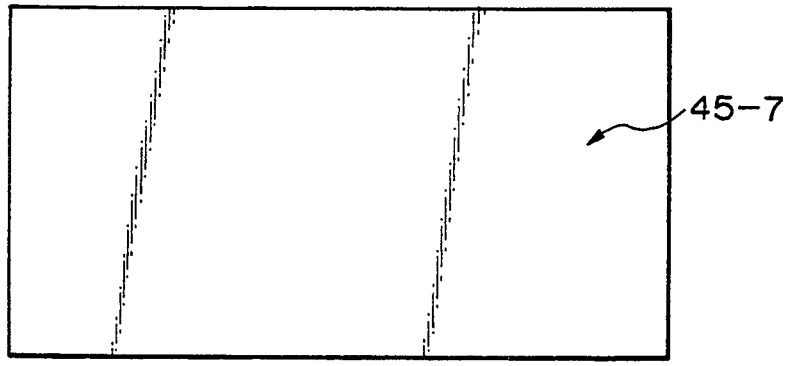
Figure 37B:
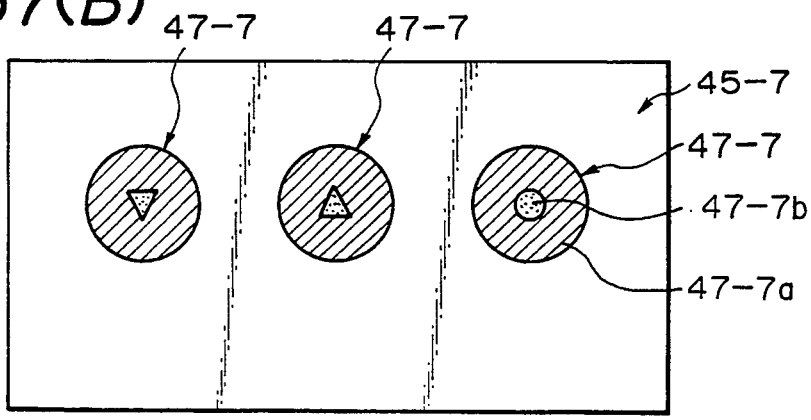
Figure 37C:
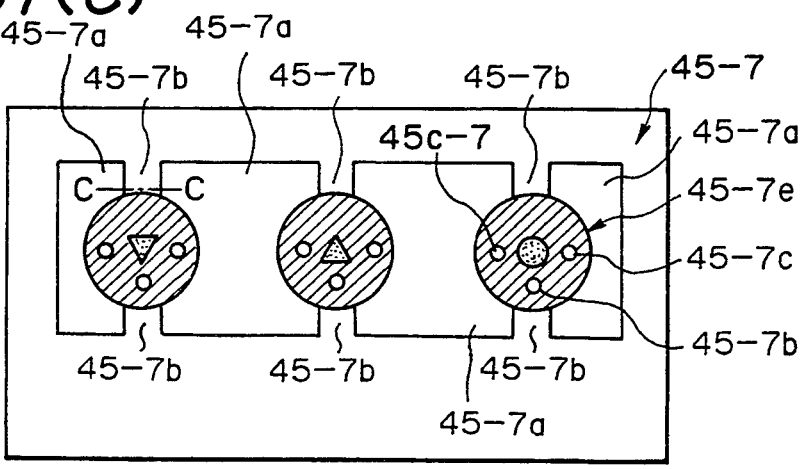

17(A) is a plan view, FIG. 17(B) a sectional view taken along line 17(B)—17(B) of FIG. 17(A), and FIG. 17(C) a bottom view:

FIG. 18 is a diagram showing still yet another embodiment of a push-button switch having a drip-proof structure according to the present invention;

FIG. 19 is a plan view of a switch control panel;

FIG. 20 is a sectional view taken along line 20—20 of FIG. 19;

FIG. 21 is a bottom view of the switch control panel;

FIG. 22 is a sectional view taken along line 22—22 of FIG. 19;

FIGS. 23(A) through 23(C) are plan, sectional and bottom views, respectively, of a keytop according to the present invention;

FIG. 24 is a plan view of a resin film showing the shapes of holes in the resin film;

FIG. 25 is a plan view of a sheet from which of upper and lower resin sheets constituting a switch portion are formed;

FIG. 26 is a diagram illustrating the resin mold of a keytop;

FIG. 27 is an exploded, perspective view of still another embodiment of a push-button switch using the keytop of the invention;

FIG. 28 is an enlarged perspective view of a portion of a switch sheet shown in FIG. 27;

FIG. 29 is a perspective view of a keytop sheet;

FIG. 30 is a perspective view of a film:

FIGS. 31(A) through 31(C) are diagrams illustrating a method of molding a keytop on a film, in which FIG. 31(A) is a diagram showing the manner in which a film is clamped by upper and lower molds, FIG. 31(B) is a diagram illustrating the manner in which the upper and lower molds are filled with a synthetic resin, and FIG. 31(C) is a diagram showing a molded keytop;

FIG. 32 is a sectional view of an assembled push-button switch:

FIG. 33 is an enlarged sectional viewing of a portion of one push-button switch;

FIG. 34 is a side sectional view for describing the operation of the push-button switch;

FIG. 35 is a perspective view showing a seventh embodiment of the structure of a keytop sheet according to the present invention;

FIGS. 36(A), 36(B), 36(C) and 36(D) are a plan view of the keytop sheet of FIG. 35, a bottom view of the keytop sheet, an enlarged sectional view taken along line 36(C)—36(C) of FIG. 36(A), and an enlarged sectional view taken along line 36(D)—36(D) of FIG. 36(A), respectively; and FIGS. 37(A) through 37(C) are diagrams for describing a method of manufacturing the keytop sheet, in which FIG. 37(A) is a diagram showing a flexible film, FIG. 37(B) is a diagram showing the manner in which patterns are printed on the film, and FIG. 37(C) is a diagram showing the manner in which patterns are formed on the film as well as the manner in which openings and through-holes are provided in the film.

DETAILED DESCRIPTION OF THE PREFERRED EMBODIMENTS

Figure 1A:
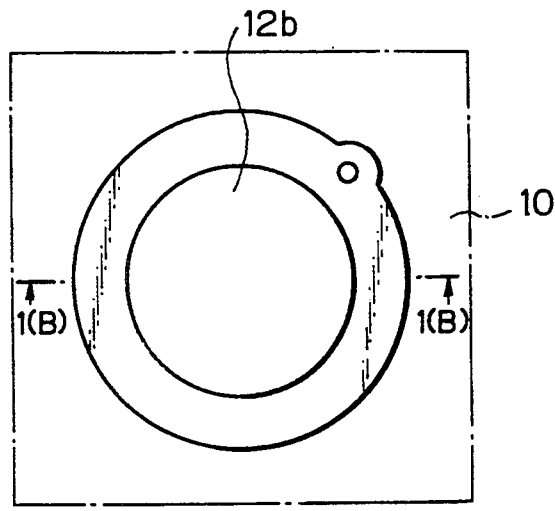
Figure 1B:
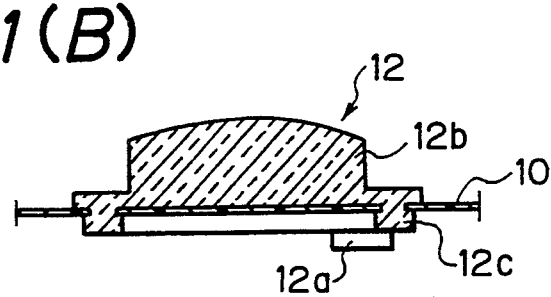
Figure 1C:
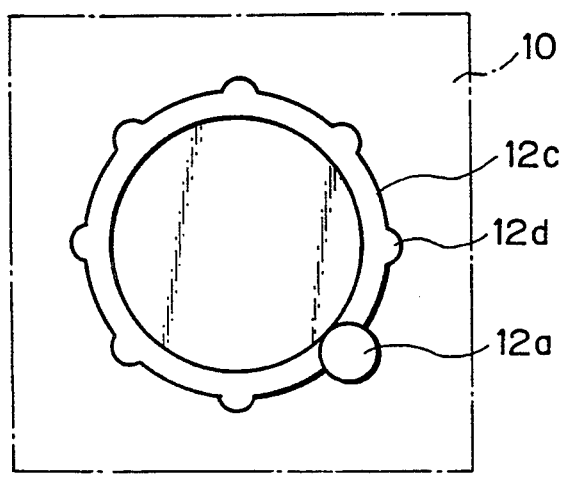

FIGS. 1(A) through 1(C) are diagrams illustrating a first embodiment of the structure of a keytop of a push-button switch according to the present invention.

As shown in FIGS. 1(A) through 1(C), a keytop 12 includes a keytop portion 12b situated on the top side of a resin film 10, and a loop-shaped retaining portion 12c situated on the underside of the resin film. The loop-shaped portion 12c, which is located directly below the keytop portion 12b in concentric relation therewith, is circular and extends along the outer circumference of the bottom surface of the keytop portion 12b.

As will be described later in greater detail, the keytop portion 12b and loop-shaped retaining portion 12c are integrally formed by a resin-molding process in which resin is passed through a plurality of holes provided in the resin film 10 in a pattern corresponding to the shapes of the loop-shaped retaining member 12c. In this way, the resin film 10 is water-tightly sandwiched between the keytop portion 12b and the loop-shaped portion 12c.

A polycarbonate resin or acrylic resin, which are thermoplastic resins, may be used as the material for the keytop 12.

The keytop 12 has a pressing protrusion 12a, which is for pressing a movable contact, provided as an integral part of the loop-shaped retaining member 12c spaced away from the center of the button surface of the keytop portion 12b.

Thus, the pressing protrusion 12a for pressing the movable contact is provided at a position offset from the center of the bottom surface of keytop portion 12b. As a result, it is unnecessary to dispose the contact portion of the switch below the center of the bottom surface of pressing protrusion 12a.

Accordingly, by using a keytop material through which light can pass, as will be described later, the surface of the keytop can be made to stand out by light from a light-emitting element if such an element is placed below the central portion of the bottom of the keytop portion 12b. More specifically, by printing a number, symbol or other indicia on the portion of the resin film 10 at which the keytop portion 12b is located, the number, symbol of indicia will be clearly visible through the keytop portion 12b. Such a keytop presents an excellent appearance.

Though the material of the keytop 12 is a light-transmissive resin which is illuminated by a light-emitting element in the foregoing embodiment, the indicia on the keytop can readily be seen from the outside even without being illuminated by a light-emitting element.

Figure 2:
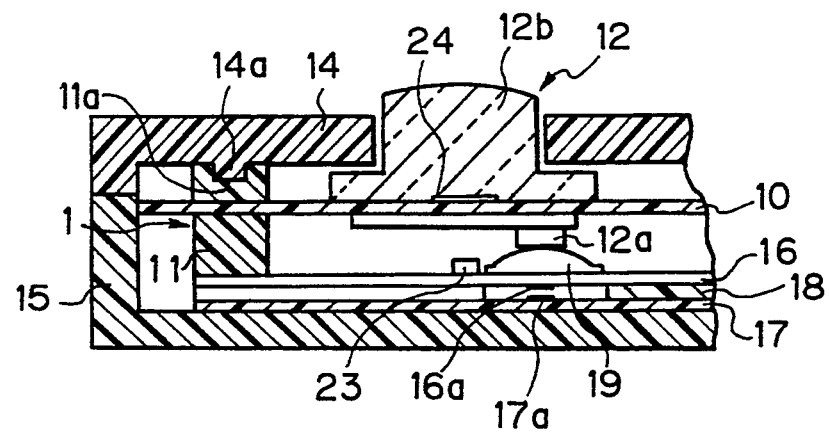
FIG. 2 is a partial sectional view of a push-button switch which uses the keytop of the present invention.

FIG. 2 is a diagram illustrating an example of the structure of a push-button switch using the keytop 12 having the structure described above.

In FIG. 2, numerals 16. 17 denote films on which a movable contact pattern 16a and a fixed contact pattern 17a, respectively, are formed. The films 16, 17 are superimposed with the contact patterns 16a, 17a made to oppose each other through the intermediary of a spacer interposed therebetween, and the films 16, 17 are secured to the lower portion of a drip-proof frame 11. A click spring 19 is disposed on the top side of the film 16 at the position where the contact pattern 16a is located, and the pressing protrusion 12a of the keytop 12 is situated on the upper portion of the click spring 19. A light-emitting element 23, such as a light-emitting diode, is disposed below the center of the key-top portion 12b.

The aforementioned drip-proof frame 11 surrounds a plurality of the keytops 12 and is maintained in a water-tight state with respect to the resin film 10, as will be described later. The assembly which includes the keytops 12, drip-proof frame 11 and films 16, 17 defines a control panel 1, which is housed in a case 15.

A panel 14 is placed upon the upper portion of the case 15 and is provided with an elongate projection 14a that is water-tightly fitted into an elongate groove 11a formed in the drip-proof frame 11.

The material constituting the drip-proof frame 11 is a thermoplastic or thermosetting synthetic resin. In order to improve the water-tight fit of the frame 11, the material constituting the frame preferably is a resilient styrene-type elastomer or a resilient polyester elastomer.

By adopting the foregoing structure for the push-button switch, humidity or moisture which seeps in from the gap between the keytop 12 and the panel 14 will not reach the switch contact portion because the keytop 12 and drip-proof frame 11 are water-tightly affixed to the resin film 10.

In addition, since the elongate groove 11a and elongate projection 14a are fitted together water tightly, moisture will not penetrate from between the drip-proof frame 11 and panel 14. The push-button switch thus has a structure exhibiting an excellent drip-proof property.

Figure 3:
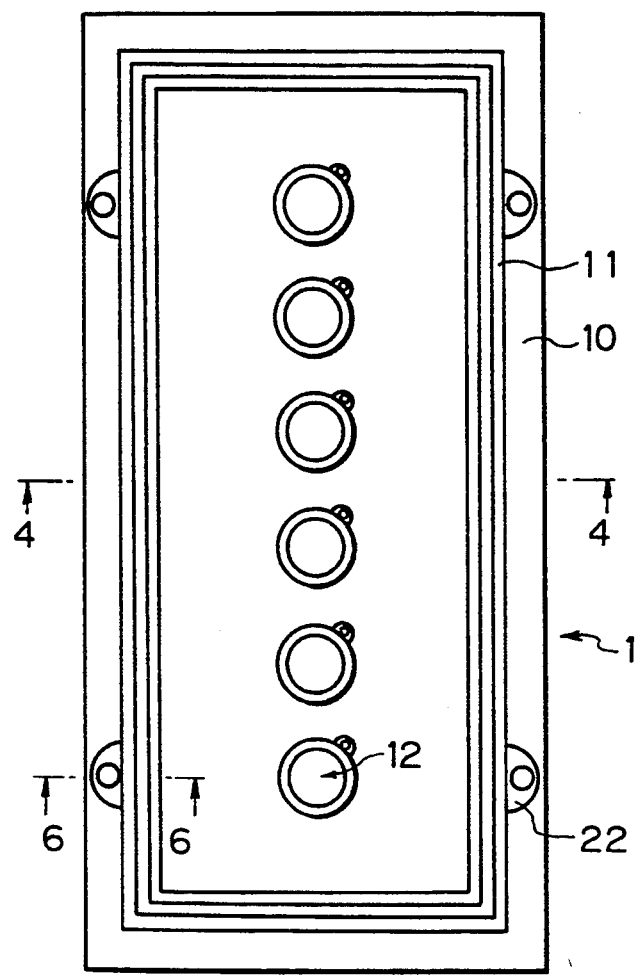
FIG. 3 is a plan view of a control panel of push-button switches having the keytop structure and drip-proof frame structure of the present invention.
Figure 4:
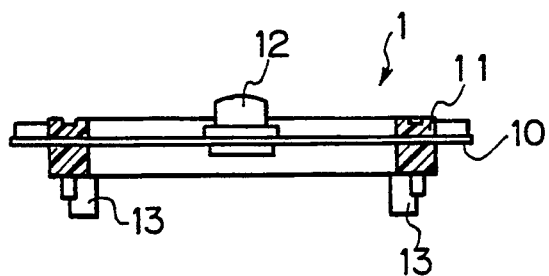
FIG. 4 is a sectional view taken along line 4—4 of FIG. 3.

FIGS. 3 through 8 are diagrams illustrating the structure of the control panel 1 of the push-button switches obtained by molding the drip-proof frame 11 and keytops 12 with the resin film. FIG. 3 is a plan view, FIG. 4 a sectional view taken along line 4—4 of FIG. 3, FIG. 5 an underside view of the control panel 1, and FIG. 6 a sectional view taken along lines 6—6 of FIG. 3.

As shown in these drawings, the drip-proof frame 11 surrounds a plurality (six in this embodiment) of the keytops 12 and is maintained in a water-tight state with respect to the resin film 10.

Figure 5:
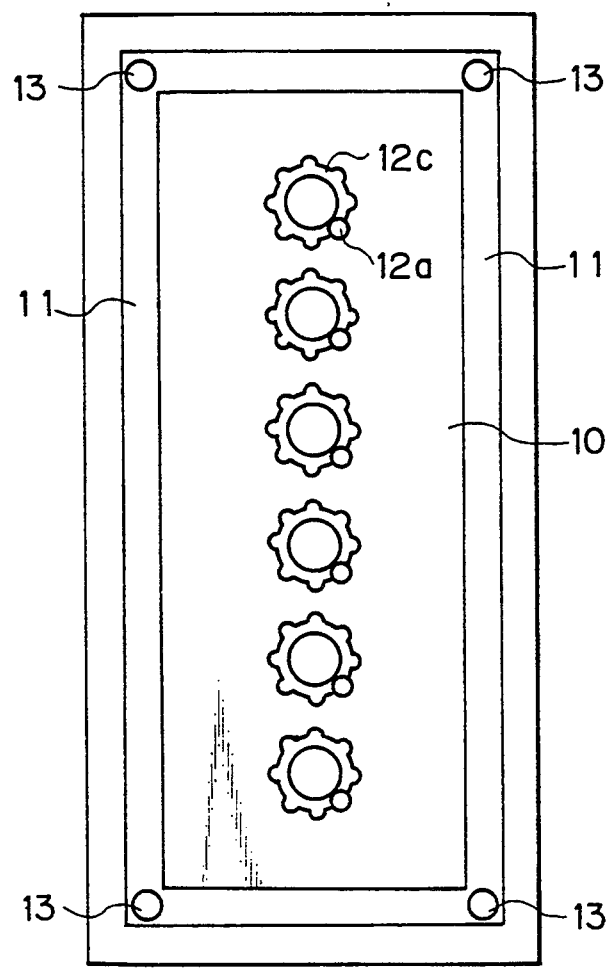
FIG. 5 is a bottom view of the control panel of the push-button switches, in which the keytop structure and the structure of the drip-proof frame are illustrated.
Figure 6:
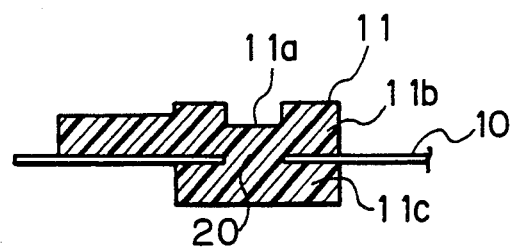
FIG. 6 is a sectional view taken along line 6—6 of FIG. 3.

More specifically, as shown in FIG. 6, the drip-proof frame 11 includes an upper portion 11b and a lower portion 11c formed to sandwich the resin film 10 therebetween, and the elongate groove 11a, which has a rectangular cross section, is formed in the top of the upper portion 11b. Further, as depicted in FIG. 5, the underside of the drip-proof frame 11 is integrally formed to have fixing portions 13 for being fixed to a substrate or the like.

Figure 7:
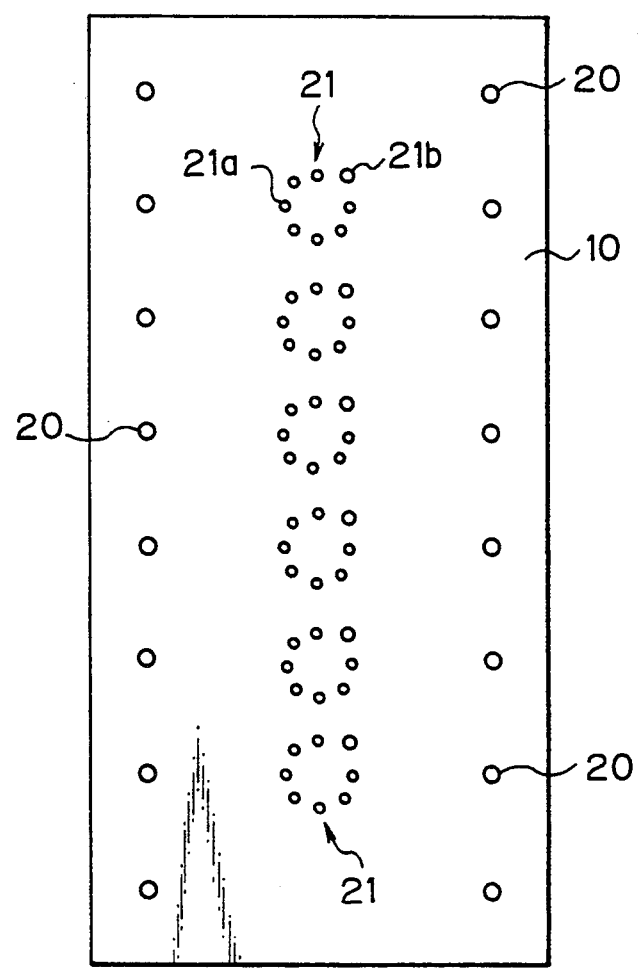
FIG. 7 is a plan view of a resin film showing the shapes of holes therein.

Here the drip-proof frame 11 is such that the resin film 10 is sandwiched between the loop-shaped upper portion 11b and loop-shaped lower portion 11c, and the upper portion 11b and lower portion 11c are merely connected through holes 20 shown in FIGS. 6 and 7. Consequently, humidity and moisture cannot seep in from between the drip-proof frame 11 and the resin film 10. In other words, a water-tight structure which keeps out humidity and moisture is formed between the resin film 10 and the drip-proof frame 11.

Described next will be a method of manufacturing the switch control panel 1 by integrally molding the drip-proof frame 11 and keytop 12 with the resin film 10. FIG. 7 is a plan view showing the external form of the resin film 10.

As shown in FIG. 7, the resin film 10 is rectangular and the portion thereof on which the drip-proof frame 11 is formed is provided at prescribed intervals with a number of holes 20 through which molten resin flows at the time of molding.

Figure 8:
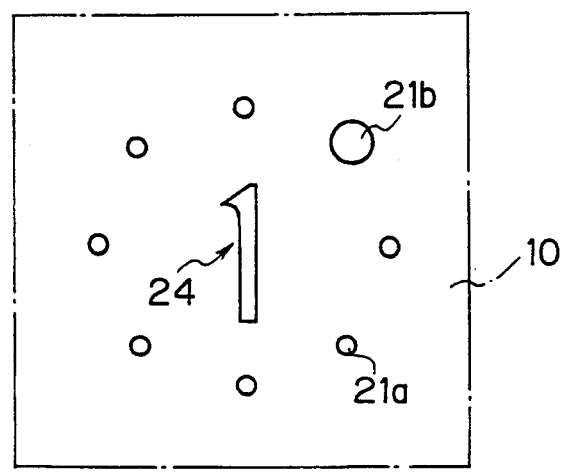
FIG. 8 is a diagram showing the shapes of holes in a resin film which forms a keytop.

As illustrated in FIGS. 7 and 8, holes 21 for forming the keytop 12 include small holes 21a and one large hole 21b in a circular array. The small holes 21a are situated at ribs 12d of the keytop 12, and the large hole 21b is situated at the protrusion 12a of the keytop 12.

If required, a number, symbol or character 24 is printed on the resin film 10 at a portion thereof where the keytop portion 12b is located. The printing can be performed on either the top side of the resin film 10, namely on the side facing the keytop, or on the underside of the resin film 10. In either case, the number, symbol or character will be clearly visible.

A method of manufacturing the keytop 12 will now be described.

Figure 9:
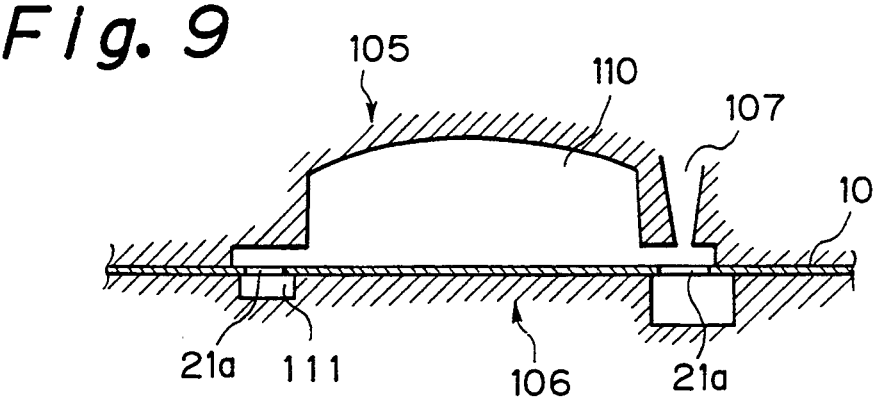
FIG. 9 is a diagram for describing a method of manufacturing the keytop.

First, as shown in FIG. 9, the resin film 10 is clamped between an upper mold 105 having a cavity 110 of the same shape as the keytop 12 (see FIG. 1) and a lower mold 106 having a cavity 111 of the same shape as the annular retaining portion 12c (see FIG. 1).

Next, a molten resin is injected from a pin gate 107 provided at a location above the protrusion 12a of the keytop 12. As a result, the molten resin flows into the cavity 110 of the upper mold 105 and also into the cavity 111 of the lower mold 106 through the holes 21a, 21b in the resin film 10.

When the upper mold 105 and lower mold 108 are parted after the resin has hardened, the result is the keytop 12.

A method of manufacturing the drip-proof frame 11 will be described next.

Figure 10:
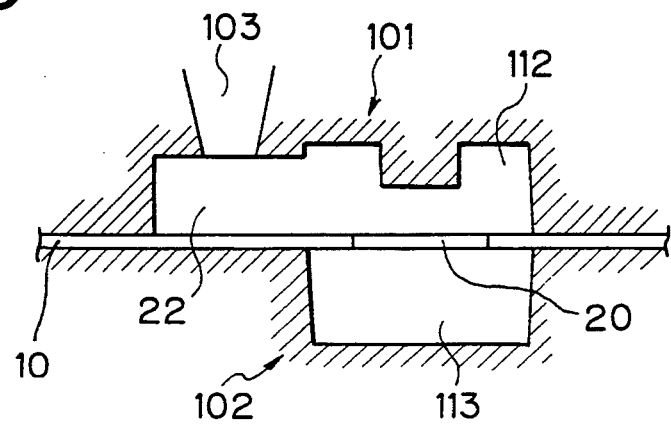
FIG. 10 is a diagram for describing a method of manufacturing the drip-proof frame.

First, as depicted in FIG. 10, the resin film 10 is clamped between an upper mold 101 having a cavity 112 of the same shape as the upper portion 11b of the frame (see FIG. 6) and a lower mold 102 having a cavity 113 of the same shape as the lower portion 11c of the frame (see FIG. 6).

Next, a molten resin is injected from a pin gate 103, whereby the molten resin flows into the cavity 112 of the upper mold 101 through a resin reservoir 22 and also into the cavity 113 of the lower mold 102 through the holes 20 in the resin film 10.

When the upper mold 101 and lower mold 102 are parted after the resin has hardened, the result is the drip-proof frame 11, which surrounds a prescribed area of the resin film 10.

Figure 11A:
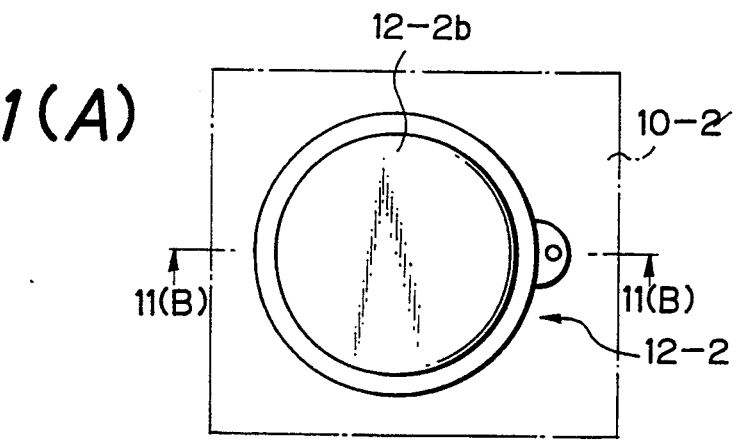
Figure 11B:
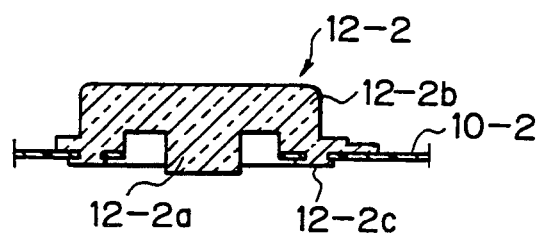
Figure 11C:
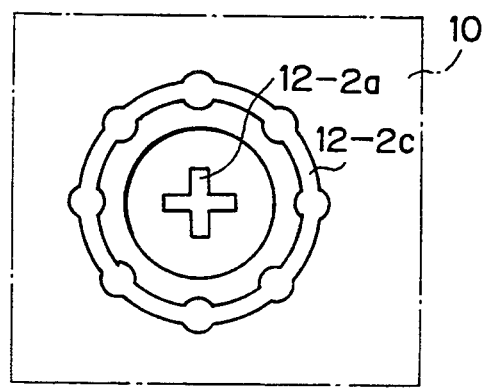
Figure 11D:
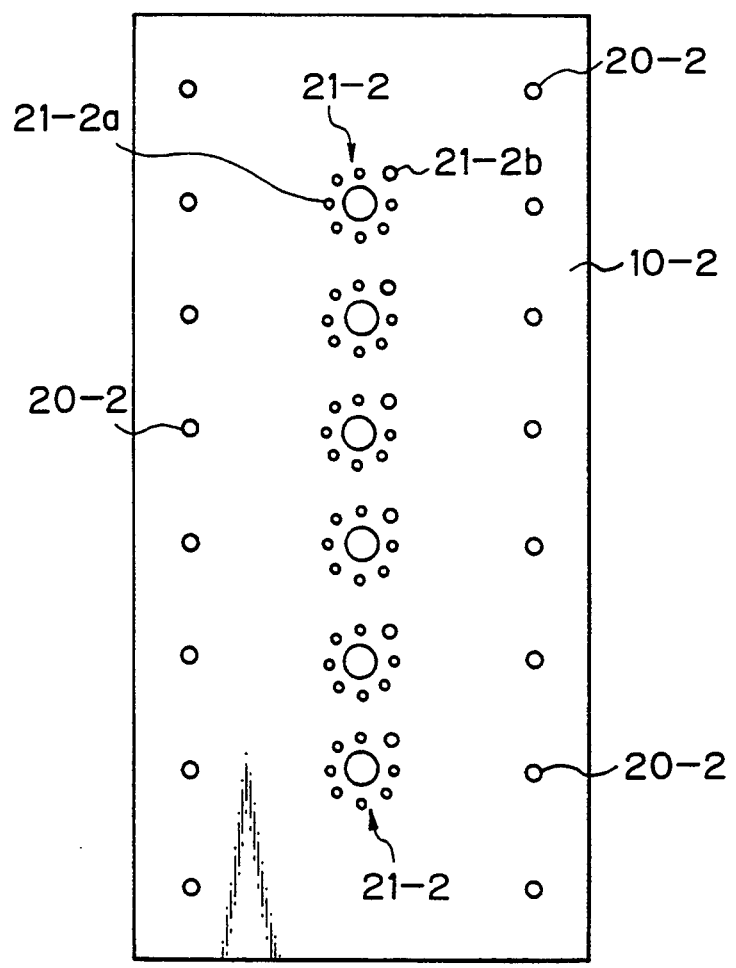

FIGS. 11(A) through 11(D) are diagrams illustrating a second embodiment of the structure of a keytop of a push-button switch according to the present invention, in which FIG. 11(A) is a plan view, FIG. 11(B) a sectional view taken along line 11(B)—11(B) of FIG. 11(A), FIG. 11(C) a bottom view, and FIG. 11(D) is a plan view of a resin film provided with holes.

A keytop 12-2 shown in FIG. 11(A) differs from the keytop 12 of FIG. 1 in that whereas the pressing protrusion 12a for pressing the movable contact of the keytop is provided as an integral part of the loop-shaped retaining portion 12c offset from the center of the lower portion of the keytop portion 12b in FIG. 1(A), the keytop of FIGS. 11(A)—11(D) is such that a pressing protrusion 12-2a passing through the resin film 10-2 approximately at the center of the lower portion of the keytop portion 12-2.

Furthermore, since the pressing protrusion 12-2a is formed approximately at the center of the lower portion of the keytop portion 12-2, the resin film 10-2 at the location situated at the center of the keytop 12-2 is cut away in the form of a circle.

It should be noted that the shapes of the keytop portions 12b, 12-2b of the keytops 12 and 12-2 are not limited to those described in the foregoing embodiments. For example, it goes without saying that the planar configuration can be rectangular or polygonal and need not be circular. In this case, the retaining portions 12c, 12-2c also should have a rectangular or polygonal loop shape to conform to the shape of the keytop portion.

In addition, the shape of the drip-proof frame 11 is not limited to that described above. For example, if the drip-proof frame is made of an elastomer having resilience, then a structure may be adopted in which the panel 14 is flat, the surface of the drip-proof frame 11 is curved in the shape of semicircular cylinder, and the panel 14 and frame 11 are brought into pressing contact.

In other words, it will suffice if the loop-shaped drip-proof frame 11 forms a water-tight seal together with the resin film by being molded onto the resin film so as to surround a prescribed area of the film.

Figure 12A:
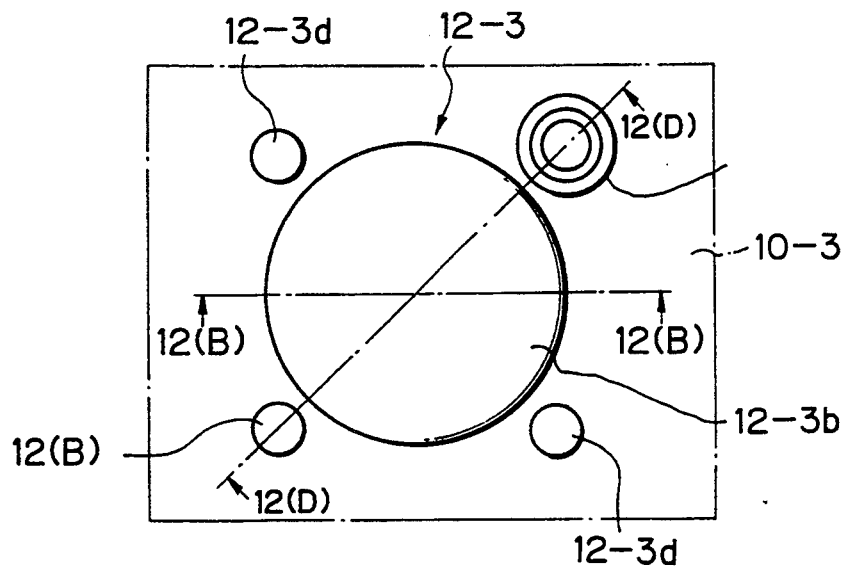
Figure 12B:
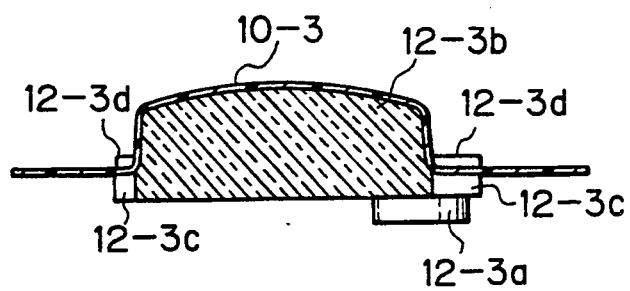
Figure 12C:
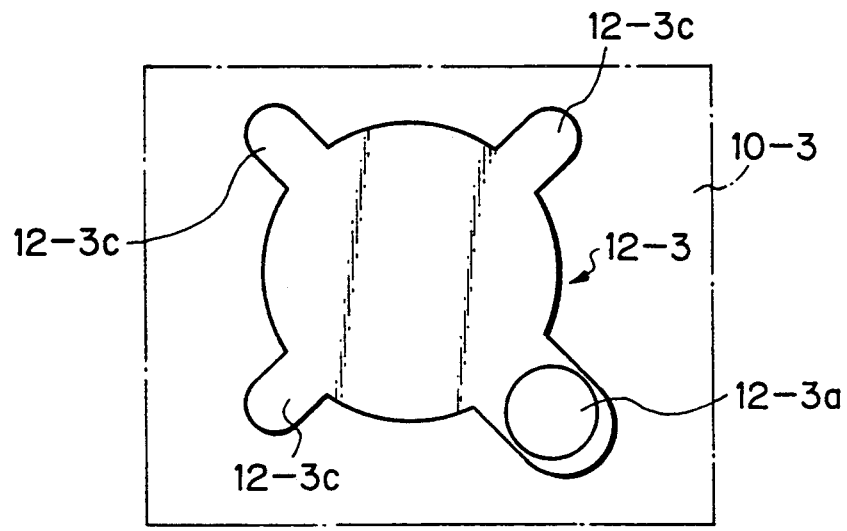

FIGS. 12(A) through 12(C) are diagrams illustrating a third embodiment of the structure of a keytop for a push-button switch according to the present invention. FIG. 12(A) is a plan view, FIG. 12(B) a sectional view taken along line 12(B)—12(B) of FIG. 12(A), and FIG. 12(C) a bottom view.

A keytop 12-3 has a keytop portion 12-3b consisting of a resin material and integral film retaining portions 12-3c provided on the periphery of the keytop portion 12-3b.

A resin film 10-3 is disposed on the top of the keytop portion 12-3b so as to cover the same, and the resin film 10-3 is fixedly sandwiched between the film retaining portion 12-3c and film fixing portions 12-3d integrally provided on the upper parts of the film retaining portions 12-3c.

A thermoplastic polycarbonate resin or acrylic resin may be used as the material for the keytop 12-3.

The keytop 12-3 has a pressing protrusion 12-3a, which is for pressing a movable contact, integrally provided the lower part of the film retaining member 12-3c spaced away from the center of the button surface of the keytop portion 12-3b.

Thus, the pressing protrusion 12-3a for pressing the movable contact is provided at a position offset from the center of the bottom surface of keytop portion 12-8b. As a result, it is unnecessary to dispose the contact portion of the switch below the center of the bottom surface of the keytop portion 12-3b.

Accordingly, by using a light-transmissive resin material for the resin film and keytop, the surface the keytop can be made to stand out by light from a light-emitting element if such an element is placed below the keytop.

More specifically, by printing a number, symbol or other indicia as necessary on the portion of the resin film 10-3 at which the keytop portion 12-3b is located, the number, symbol or indicia will be clearly visible above the keytop portion 12-3b. Such a keytop presents an excellent appearance.

Figure 13:
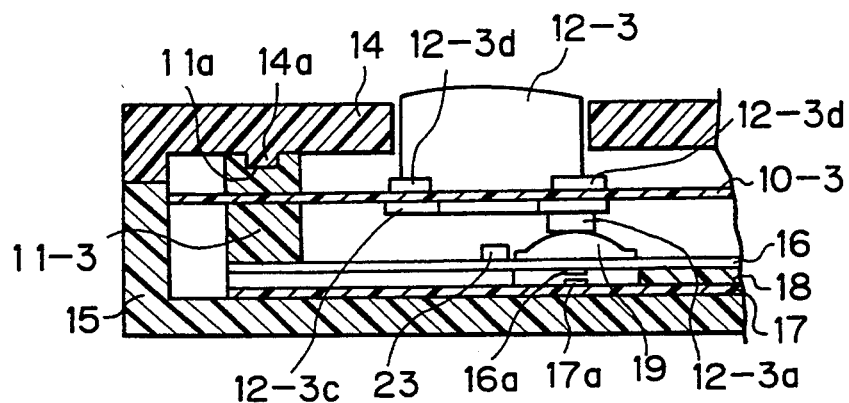
FIG. 13 is a partial sectional view another embodiment of a push-button switch according to the present invention.

FIG. 13 is a diagram illustrating the structure of a push-button switch using the keytop 12-3 having the structure shown in FIG. 12. This push-button switch is substantially the same as that of FIG. 2 and need nor be described again.

Described next will be a method of manufacturing a switch control panel obtained by integrally molding a drip-proof frame 11-3 and keytops with the resin film 10-3.

Figure 14:
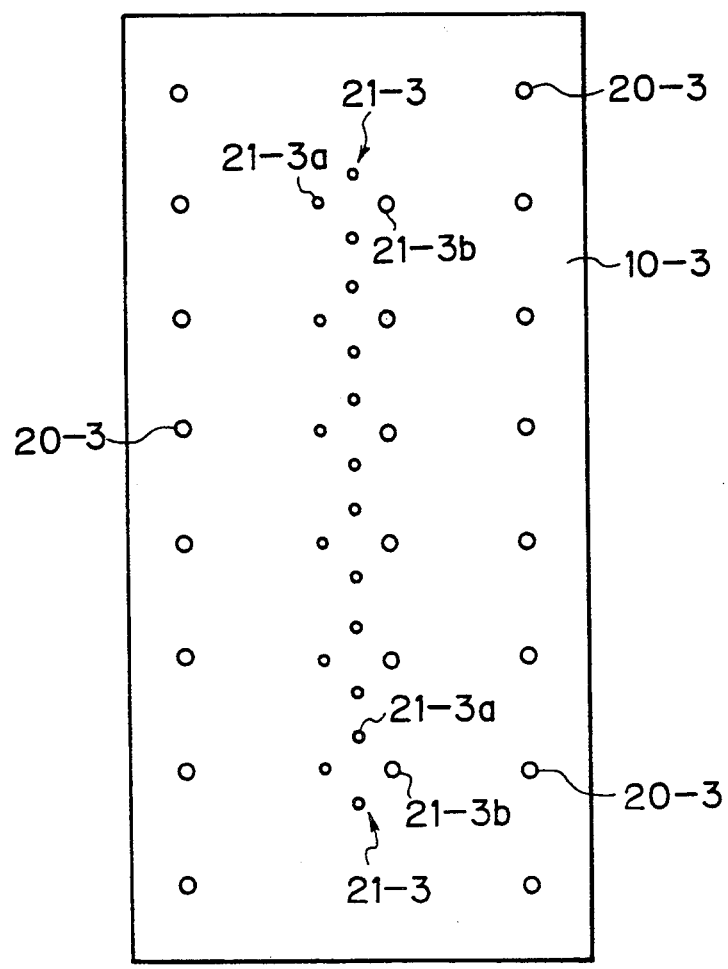
FIG. 14 is a plan view of a resin film of the switch showing the shapes of holes in the resin film.

FIG. 14 is a plan view showing the external form of the resin film 10-3.

As shown in FIG. 14, the resin film 10-3 is rectangular and the portion thereof on which the drip-proof frame 11-3 is formed is provided at prescribed intervals with a number of holes 20-3 through which resin flows at the time of molding.

Further, the portion of the resin film 10-3 on which the keytops 12-3 are formed is provided at prescribed intervals with hole groups 21-3 each having small holes 21-3a (at three locations in this embodiment) and one large hole 21-3b (at one location in this embodiment) through which the molten resin flows.

Figure 15:
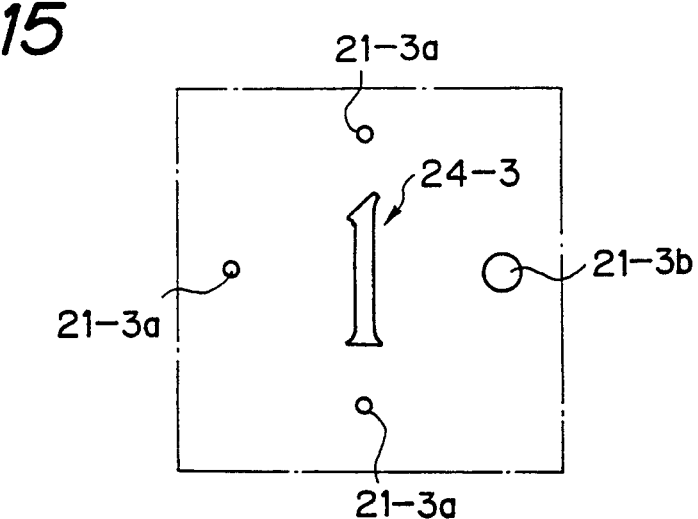
FIG. 15 is a diagram showing the shapes of holes in a resin film which forms a keytop.

If required, as shown in FIG. 15, a number, symbol or character 24-3 is printed on the resin film 10-3 an a portion thereof where the keytop portion 12-3b is located. The printing can be performed either on the top side or underside of the resin film 10-3.

Figure 16A:
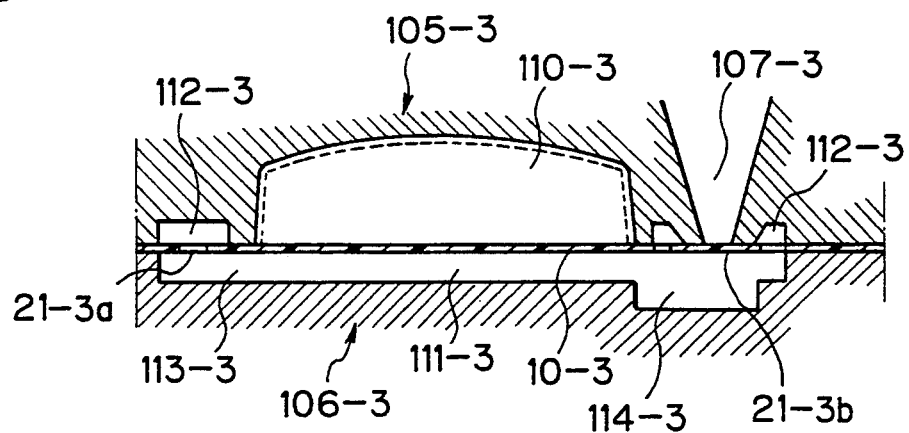
FIGS. 16(A) and 16(B) are diagrams for describing a method of manufacturing the keytop.
Figure 16B:
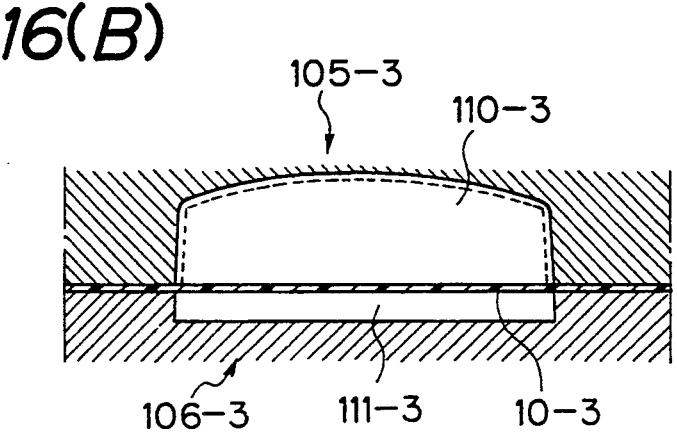

FIG. 16(A) and FIG. 16(B) are diagrams showing a structure, in which the resin film is clamped between upper and lower molds, useful for describing the method of manufacturing a keytop according to this embodiment. FIG. 16(A) is a cross-sectional view of the molds 105-3, 106-3 corresponding to a cross section of the keytop 12-3 taken along line 12(D)—12(D) but not shown in FIG. 12(A), and FIG. 16(B) is a cross-sectional view corresponding to a cross section of the keytop 12-3 taken along line 12(B)—12(B) of FIG. 12(A). As illustrated in these drawings, the resin film is clammed between an upper mold 105-3 and a lower mold 108-3.

The upper mold 105-3 has a cavity 110-3 of the same shape as the upper part of keytop portion 12-3b (see FIG. 12) and a cavity 112-3 of the same shape as the film fixing portion 12-3d. The lower mold 106-3 has a cavity 111-3 of the same shape as the lower part of keytop portion 12-3b, a cavity 113-3 of the same shape as the film retaining portion 12-3c, and a cavity 114-3 of the same shade as the pressing protrusion 12-3a.

Thus, the resin film 10-3 is clamped by the upper mold 105-3 and the lower mold 106-3, and a molten resin is injected from a pin gate 107-3 situated above the large hole 21-3b. As a result, the molten resin flows into the cavities 114-3, 111-3 and 113-3 of the lower mold 106-3 through the hole 21-3b formed in the resin film 10-3.

At this time, as shown in FIG. 16(B), these portions of the film 10-3 which do not face the cavities 111-3, 113-3 and 114-3 formed in the lower mold 106-3 are strongly clamped by the upper and lower molds, and therefore the molten resin which has flowed in deforms the film 10-3 and forces it into intimate adhering contact with the inner wall of the upper mold 105-3. The molten resin flows into the cavity 110-3 of the upper mold 105-3 and flows also into the cavity 112-3 of the upper mold 105-3 through the hole 21-3a formed in the resin film 10-3.

As a result of the foregoing, the resin film 10-3 is deformed and comes into intimate adhering contact with the inner wall of the cavity 110-3 of upper mold 105-3, as indicated by the dashed line.

When the upper mold 105-3 and lower mold 106-3 ace parted after the molten resin has hardened, the result is the keytop 12-3, in which the surface of the keytop portion 12-3b is covered with the resin film, as illustrated FIGS. 12(A) through 12(C).

In the embodiment described above, the upper mold 105-3 is provided with the pin gate 107-3, and the molten resin is charged into the cavities 111-3, 113-3 and the lower mold 106-3 through the large hole 21-3b formed in the resin film 10-3. However, it is permissible to provide a pin gate opening to the cavity 114-3 of the lower mold 106-3 and to charge the molten resin directly into the cavity The gist of the method of manufacture according to this embodiment of the invention resides in molding the keytop 12-3 in the resin film 10-3 while the resin film is deformed into the shape of the cavity 110-3. Accordingly, the results are influenced by the shape of the keytop 12-3 and the charging conditions of the molten resin.

According to this embodiment, a keytop was manufactured in which the thickness of the resin film was 0.2 mm and the height of the keytop 12-3 was made less than ½ the diameter. The result was that the resin film 10-3 was deformed into intimate contact with the inner wall of cavity 110-3 of upper mold 105-3, as indicated by the dashed line.

For charging of the molten resin, it is necessary to set the temperature of the molten resin, the injection (charging) pressure, the injection speed, the injection time and the temperature of the molds to suitable values. In this embodiment, molding at a high yield was achieved by setting the temperature of the molten resin to 240° C., the mold temperature to about 80° C., the injection time to about 3 sec, cooling time to about 10 sec, the injection pressure of the injection molding machine to 1400 kg, and the injection speed to 15 mm/sec.

FIGS. 17(A) through 17(C) are diagrams illustrating a fourth embodiment of the structure of a keytop for a push-button switch according to the present invention. FIG. 17(A) is a plan view, FIG. 17(B) a sectional view taken along line 17(B)—17(B) of FIG. 17(A), and FIG. 17(C) a bottom view.

A keytop 12-4 has a keytop portion 12-4b consisting of a resin material, and an integral film retaining portion 12-4c provided on the periphery of the keytop portion 12-4b.

As in the keytop shown in FIGS. 12(A)—(C), the resin film 10-4 in this embodiment is disposed on the top of the keytop portion 12-4b so as to cover the same, and the resin film 10-4 is fixedly sandwiched between the film retaining portion 12-4c and a film fixing portion 12-4d integrally provided on the upper part of the film retaining portion 12-4c.

This keytop 12-4 differs from the keytop of FIGS. 12(A)—(C) in that a pressing protrusion 12-4f which presses the movable contact is projects beyond the underside of the film retaining portion 12-4c at the center of the lower part of the keytop portion 12-4b.

Also, as in the keytop 12 of FIG. 1, a thermoplastic polycarbonate resin or acrylic resin may be used as the material for the keytop 12-4. Furthermore, the only difference in the method of manufacture is that the shape of the cavity in the lower mold corresponds to the shape of the keytop 12-4. In other aspects, the method of manufacture is the same as that for the keytop of FIG. 1 and need not be described again.

In this embodiment, a light-transmissive resin material is used for the resin film 10-4 and keytop 12-4. By printing a number, symbol or other indicia as necessary on the portion of The resin film 10-4 at which the keytop portion 12-4b is located, the number, symbol or indicia be clearly visible. Such a keytop presents an excellent appearance.

It should be noted that the shape of the key top portion 12-4b of the keytop 12-4 is not limited to that described in the foregoing embodiment. For example, it goes without saying that the planar configuration can be rectangular or polygonal and need not be circular.

Further, although four of the film retaining portions 12-4c are provided in a radiating fashion on the outer circumference of the keytop portion 12-4b on the bottom thereof, the film retaining portions 12-4c are not limited to this arrangement. In order to increase the strength of adherence between the keytop 12-4 and the resin film 10-4, the number of radiating film retaining portions 12-4c may be increased. In addition, the film fixing portions 12-4d may be connected in the form of a ring.

In other words, so long as the resin film 10-4 is capable of being strongly clamped by the upper mold 105-4 and lower mold 106-4 at the locations of the keytop 12-4, the film retaining portions 12-4c and film fixing portions 12-4d may be of any number and of any shape.

FIG. 18 is a sectional view showing a fifth embodiment of a push-button switch according to the present invention. In FIG. 18, numeral 29 denotes a substrate, located at the corner portion of the case of an electronic appliance, for example. Upper and lower resin sheets 16-5, 17-5 having a spacer 18-5 interposed between therebetween are arranged on top of the substrate 29. The lower resin sheet 17-5 has a fixed-contact pattern 17-5a of a switch, and upper resin sheet 16-5 has a movable contact 16-5a of the switch. The fixed contact 17-5a and movable contact 16-5a oppose each other.

A click spring 19-5 is disposed at a location where the movable contact of the upper resin film 16-5 is formed, and a keytop 12-5 provided water-tightly on the resin film 10-5 is disposed on the click spring 19-5, as will be described later in greater detail.

Numeral 11-5 denotes a drip-proof frame provided water-tightly on the resin film 10-5 so as to surround a prescribed area of the film, as will be described later.

Numeral 14-5 designates a panel, which defines a curved surface. The upper portion of the keytop 14 penetrates a hole 24A provided in the panel 12-5 and is exposed from above. As will be set forth later, tile drip-proof frame 11-5 and the panel 14-5 are fitted together in a water-tight state by mating a projection with a groove. The drip-proof frame 11-5 also is attached to the substrate 29 in a water-tight state.

The arrangement is such that pressing the keytop 12-5 causes the movable contact 16-5 to come into abutting contact with the fixed contact 17-5a.

As will be set forth below, the keytop is attached to the resin film 10-5 in a water-tight state, and the drip-proof frame 11-5 is attached to the resin film 10-5 in a water-tight state. As a result, the structure is such that moisture or humidity which seeps in from in the panel 14-5 will not invade the contact portion, which comprises the resin sheet 16-5, 17-5 and the like. The structure of each portion of the push-button switch constructed as set forth above will now be described in detail.

As illustrated in FIGS. 19 through 22, the loop-shaped drip-proof frame 11-5 is formed on the resin film 10-5 by being molded with the film 10-5 in a state so as to surround a prescribed area of the film. The keytop 12-5 is formed within the drip-proof frame 11-5 in a water-tight state with respect to the resin film 10-5.

As shown in FIG. 22, the drip-proof frame 11-5 has an upper portion 11-5b and a lower portion 11-5c which sandwich the resin film 10-5 between them. The top side of the upper portion 11-5b is formed to have an elongate groove 11-5a having a rectangular cross section, and a fixing portion 11-5d for being fixed to the substrate is formed as an integral part of the underside of tile drip-proof frame 11-S.

Here the drip-proof frame 11-5 is formed so that the resin film 10-5 is sandwiched between the loop-shaped uper portion 11-5b and loop-shaped lower portion 11-5c, and the upper and lower portions 11-5b, 11-5c are integrally connected through a hole 20-5 formed in the resin film 10-5. Consequently, humidity and moisture cannot seep in from between the drip-proof frame 11-5 and the resin film 10-5. In other words, a water-tight structure which keeps out humidity and moisture is formed between the resin film 10-5 and the drip-proof frame 11-5.

The material constituting the drip-proof frame 11-5 is a resilient synthetic resin, such as a styrene-type elastomer or a polyester elastomer.

As depicted in FIGS. 23(A)–(C), the keytop 12-5 includes a keytop portion 12-5b forming on the upper portion of the keytop and an annular retaining portion 12-5c forming the lower portion so as to sandwich the resin film 10-5, and the underside is formed to have a protrusion 12-5a for pressing the movable contact of the switch. The material constituting the keytop 12-5 consists of a thermoplastic resin, namely polycarbonate resin or acrylic resin.

Here the keytop 12-5 is such that the resin film 10-5 is sandwiched between the keytop portion 12-5b and the annular retaining portion 12-5c, and the keytop portion 12-5b and annular retaining portion 12-5c are integrally connected through holes 21-5 shown in FIG. 23(B). FIG. 24 is a plan view of a resin film 10-5 having the holes 20-5 for facilitating the molding the drip-proof frame 11-5, the holes 21-5 for facilitating the molding the keytops 12-5, and holes 22 through which the protrusions 12-5a. Consequently, humidity and moisture cannot seep in from between the keytop 12-5 and the resin film 10-5. In other words, a water-tight structure keeps out humidity and moisture is formed between the resin film 10-5 and the keytop 12-5.

FIG. 25 is a plan view showing the shapes of upper and lower resin sheets 16-5, 17-5. As shown it FIG. 25, the upper and lower resin sheets 16-5, 37-5 are formed of a single resin sheet cut to the shape shown in the figure.

Formed on the lower resin sheet 17-5 are fixedcontact patterns 17-5a, 17-5a, 17-5a and a wiring pattern 17-5b serially connecting the fixed-contact patterns 17-5a, 17-5a, 17-5a. Formed on the upper resin sheet 16-5 are movable-contact patterns 16-5a, 16-5a, 16-5a and wiring patterns 16-5b, 16-5b, 16-5b connected to respective ones of the movable-contact patterns 16-5a, 18-5a, 16-5a. In order to facilitate folding, the upper resin sheen 16-5 is provided with grooves 25-5 between the movable-contact patterns 16-5a, 16-5a.

Cut-outs 23-5 are formed between the upper resin sheet 16-5 and the lower resin sheet 17-5. Contact are formed by folding the upper resin sheet 16-5 and lower resin sheet 17-5 about the cut-outs 23-5 interposing the therebetween the spacer 18-5.

The formation of the keytop 12-5 by resin molding will be described below.

As depicted in FIG. 28, the resin film 10-5 is clamped between an upper mold 105-5 having a cavity 110-5 of the same shape as the keytop portion 12b [see FIGS. 23(A) through 23(C)], and a lower mold 106-5 having a cavity 111-5 of the same shape as the annular retaining portion 12-5c [see FIGS. 23(A) through 23(C)] and a cavity 112-5 of the same shape as a protrusion 18-5a.

Next, a molten resin is injected from a pin Kate 107-5, whereby the molten resin flows into the cavity 110-5 of the upper mold 105-5 and the cavity 112-5 of the lower mold 106-5. The molten resin flows also into the cavity 111-5 of the lower mold 106-5 through holes 21-5 in the resin film 16-5.

The keytop 12-5 is formed by allowing the molten resin to harden. The formation of the drip-proof frame 11-5 is substantially the same as tile method described connection with FIG. 10 and need not be explained again.

The manner in which the push-button switch is on the main body of an appliance will now be described. First, as shown in FIG. 18, the resin sheets 16-5, 17-5 on which the fixed-contact pattern 17-5a and movable-contact pattern 16-5b are formed are folded about the cut-outs 23-5 with the spacer 18-5 interposed between the folds, and the resin sheets thus folded are placed upon the curved surface of the substrate 29.

Next, the fixing portions 11-5d (ten of which are provided in this embodiment) of the drip-proof frame 11-5 are press-fitted into fitting holes provided in the surface of the substrate 29.

The reason for providing more than two pairs of the fixing portions 11-5d in the longitudinal direction of the drip-proof frame 11-5 is so that the switch control panel will be maintained at a fixed distance from the curved substrate surface. Next, a fitting projection 14-5a provided on the curved panel 14-5 is fitted into the elongate groove 11-5a formed in the top of the drip-proof frame 11-5. This completes the mounting of the push-button switch in this embodiment.

FIG. 27 is an exploded, perspective view showing a sixth embodiment of a push-button switch using the keytop of the invention. As shown in FIG. 27, a push-button switch 70 comprises, in a superimposed relation, a lower case 60, a switch sheet 30, a keytop sheet 40 and an upper case 50.

Each of the components constituting the push-button switch 70 will now be described.

A number of click plates 34 are attached to the top of the switch plate 30, and a membrane switch is disposed on the underside of each switch plate.

FIG. 28 is an enlarged, exploded perspective view showing the portion A (one membrane switch) of the switch sheet 30 shown i n FIG. 27.

The switch sheet 30 illustrated in FIG. 28 comprises a first substrate 31 consisting of a resilient synthetic resin film provided with a contact pattern 31a at a predetermined position on the top thereof, and a spacer 32 consisting of a resilient synthetic resin film provided with a through-hole 32a at a predetermined position.

The switch sheet 30 further comprises a second substrate 33 provided with a contact pattern 33a at a predetermined position of the underside thereof. The substrates 31, 33 and spacer 32 are bonded together in such a manner that the contact pattern 31a of the first substrate 31 and the contact pattern 33a of the second substrate will oppose each other via the through-hole 32a of the spacer 32. The switch sheet 30 is thus constructed.

It should be noted that one membrane switch is constructed at the portion where the fixed contact patterns 31a and 33a oppose each other.

The click plate 34, which consists of an upwardly bent resilient metal plate, is bonded to the top of the second substrate 33 at the position where the two contact patterns oppose each other.

Further, as illustrated in FIG. 27, light-emitting elements 35 are attached to the top of the switch sheet 30 at prescribed positions.

Next, the keytop sheet 40 to which the present invention is applied is constructed by directly attaching a number of keytops 41 to a film 45 made of synthetic resin.

FIG. 29 is a perspective view showing the underside of the keytop sheet 40.

As shown in FIGS. 27 and 29, each keytop 41 comprises an actuating portion 41a formed on the top of the film 45, and a pressing portion 41b protruding from the underside of the film 45. The actuating portion 41a and pressing portion 41b of the keytop 41 are integrally molded via a hole 46 provided in the film 45.

The method of manufacturing the keytop sheet 40 will be described next.

FIG. 30 is a perspective view showing the film 45. As shown in FIG. 30, the film 45 is of a synthetic resin formed as a flexible thin sheet and provided with small holes 4 at positions corresponding to the click plates 34 of the switch sheet 30 shown in FIG. 27.

FIG. 31(A) through FIG. 31(C) are diagrams illustrating a method of resin molding the keytops 41 on the film 45. It should be noted that FIG. 31 illustrates only one keytop 41 among the plurality thereof.

First, as depicted in FIG. 31(A), the film 45 is clamped from above and below by an upper mold 105 and a lower mold 106-6. The portion of the upper mold 105-6 corresponding to the hole 46 is provided with a cavity 110-6 for molding the actuating portion 41a of the keytop 41. The upper mold 105-6 is provided also with a pin gate 107-6 in the vicinity of the outer circumference of the cavity 110-6. The portion of the lower mold 106-6 corresponding to the hole 46 is provided with a cavity 111-6 for molding the pressing portion 41-b of the keytop 41.

Next, as shown in FIG. 31(B), a synthetic resin is injected from the pin gate 107-6 so as o fill the cavities 110-6 and 111-6.

As illustrated in FIG. 31(C), the upper mold 105-6 and lower mold 106-6 are removed after the injected synthetic resin has hardened. This completes the formation of the keytop 41 on which the actuating portion 41a and pressing portion 41b are integrally molded via the hole 46 of film 45.

When the keytop 41 is thus directly molded on the film 45, the underside of the actuating portion 41a of the keytop is closely adhered to the top side of the film, and the top side of the pressing portion 41b is closed adhered to the underside of the film Next, the upper case 50 shown in FIG. 27 is molded out of synthetic resin, and the upper case 50 is provided with circular holes 51 at positions corresponding to the keytops 41.

The lower case 60 shown in FIG. 27 is then formed from a metal plate the periphery of which is provided an upstanding edge 63. Portions of the upstanding edge are provided with tabs 61, each of which has a mounting hole 62.

In order to assemble the push-button switch 70, the switch sheet 30 is placed upon the lower case 60, as shown in FIG. 27. An adhesive is applied to an adhering surface 47 (the entire periphery of the top of film 45) of the keytop sheet 40, and the keytop sheet 40 is bonded to the underside of the upper case 50. The upper case 50 is then placed upon the lower case 60 and secured thereto to complete the construction of the push-burton switch 70.

FIG. 32 is a side sectional view illustrating the push-button switch 70 thus assembled. As illustrated in FIG. 32, a screw 71 is inserted into the mounting hole 62 of the tab 61 provided on the lower case 60, the lower case 60 is fitted into the upper case 50 within the outer circumferential wall thereof, and the two cases are secured to each other. The click plates 34 are situated beneath respective ones of the keytops 41, as shown.

FIG. 33 is an enlarged side sectional view showing one push-button switch portion of the push-button switch The lower case 60, it should be noted, is omitted from the drawing.

As shown in FIG. 33, the push-button switch 70 is such that the click plate 34 and corresponding keytop 41 are arranged above a membrane switch composed of a contact pattern 31a and a contact pattern 33a which oppose each other via the through-hole 32a of the spacer 32.

If the actuating portion 41a of the keytop 41 is pressed, as illustrated in FIG. 34, the film 45 is flexed and presses against the click plate 34, which performs a snap action. In addition, the second substrate 33 is pressed downward and causes the contact pattern 33a to contact the contact pattern 31a, thereby turning on (i.e., closing) the two contacts.

When the pressing force is removed from the keytop 41, the latter is restored to the original position by a restoration force which attempts to return the click plate 32 and film 45 to their original states. As a result, the membrane switch is turned off (i.e., opened).

In this embodiment of the present invention, as described above, the underside of the actuating portion 41a of keytop 41 and the top side of the pressing portion 41b are closely adhered to the upper and lower surfaces of the film 45, and therefore gaps do not form between the film 45 and the keytop 41. That is, the hole 46 provided in the film 45 is plugged by the keytop 41. Consequently, even if a water droplet invades the keytop 41 or film 45 from the hole 51 in the upper case 50, the water droplet will not seep down into the switch from the hole 46 in the film 45.

Further, in the present invention, the fact hat a number of the keytops 41 are directly molded on the thin film 45 makes it possible to considerably reduce the thickness of the group of keytops 41.

If the keytop 41 consists of a light-transmissive material, light emitted by the light-emitting element 35 shown in FIG. 27 will be introduced to the interior of the keytop 41 to clearly illuminate the same.

Although an example of a push-button switch us in the keytop according to the present invention has been described in detail, the invention is not limited to the illustrated arrangement and various modifications are possible, as set forth below.

Although the switch arranged below the keytop is a membrane switch in the foregoing embodiment, the switch which the keytop of the invention is not limited thereto. A membrane switch of a different structure may be employed, and the push-button switch may be provided with a structure other than that of a membrane switch.

The shape of the keytop is not limited to that foregoing embodiment. As long as a film is provided with a plurality of holes and the keytop extends from the top side to the underside of the film via each hole, the keytop may have any desired shape.

FIG. 35 is a perspective view showing a seventh embodiment of a keytop sheet according to the present invention.

As shown in FIG. 35, a keytop sheet 40-7 is constructed by directly molding three keytops 41-7 on a film 45-7 made of synthetic resin. FIGS. 36(A) through 36(C) are diagrams illustrating the keytop sheet 40-7, in which FIG. 36(A) is a plan view, FIG. 36(B) a bottom view, FIG. 36(C) an enlarged sectional view taken along line 36(C)–36(C) of FIG. 36(A), and FIG. 36(D) an enlarged sectional view taken along line 36(D)–36(D) of FIG. 36(A).

The keytop sheet 40-7 shown in FIG. 36 includes a flexible, transparent film 45-7 made of synthetic resin (e.g., polyethylene terephthalate) provided with holes 45-7a at four locations, and has keytops 41-7 made of synthetic resin directly molded on three circular keytop-mounting surfaces remaining between the holes 45-7a.

Each keytop 41-7 is molded from a transparent synthetic resin and includes an actuating portion 41-7a provided on the top of the film 45-7 three film fixing portions 41-7b provided on the underside of the film 45-7 via holes 45-7c provided in the film 45-7, and a protruding portion 41-7c provided on the underside of the film 45-7.

As shown in FIG. 36(A), if required a prescribed light-transmissive symbol 46-7b is printed on the underside of the film 45-7 to which the keytop 41-7 is attached (namely the underside of the keytop-mounting surface 45-7e of film 45-7), and the periphery of the symbol 46-7b is printed so as to have an opaque portion 46-7a (indicated by the hatching in FIG. 36(B)).

Accordingly, the symbol 46-7b is visible from the top side of the keytop 41-7 via the transparent film 457 and actuating portion 41-7a. If illuminated with light from the lower side of the film 45-7, the symbol 46-7b shows up very clearly.

The method of manufacturing the keytop sheller 40-7 will now be described.

FIG. 37(A) through FIG. 37(C) are diagrams slowing the method of manufacturing the keytop sheet 40-7.

First, as shown in FIG. 37(A), a thin, flexible film 45-7 consisting of a polyethylene sheet is prepared. Next, as illustrated in FIG. 37(B), a prescribed pattern 47-7 is printed at a predetermined position on the film 45-7 (namely on a portion of the film which will become she keytop-mounting surface 45-7e in the following sep). As illustrated, the pattern 47-7 is constituted by a circular opaque portion 47-7a that is black, by way of example, and a light-transmissive symbol 47-7b that is white, example.

Next, as depicted in FIG. 37(C), the holes 45-7a are provided in the film 45-7 to both sides of the portions furnished with the patterns 47-7 (namely at the portions serving as the keytop-mounting surfaces 45-7e to which the keytops 41-7 are attached), and the through-holes 45-7c are provided at three locations for each of the keytop-mounting surfaces 45-7e. Hinge portions 45-7b, 45-7b are left above and below the keytop-mounting surfaces 45-7e.

The method of forming the keytops 41-7 of the keytop sheet 40-7 is substantially the same as in FIG. 31 and need not be described again.

The keytop of the push-button switch according to the present invention is not limited to that of the foregoing embodiment and can be modified in various ways.

In the present embodiment, the film 45-7 is transparent. However, so long as the character, number or symbol on the film 45-7 can be directly distinguished from above the keytop, this will suffice. Therefore, if he material constituting the keytop is transparent or semitransparent, he film 45-7 may be opaque.

One of the two hinge portions for each switch can be eliminated by cutting the hinge portion 45-7b along line C-C shown in FIG. 37(C).

By constructing the keytops in the manner set forth above, the printing of the symbols is performed on the film As a result, it is unnecessary to print characters, numbers or symbols on the keytops, as is done in the prior art, thereby making it easy to perform printing.

In the prior art, it is necessary to print characters, numbers or symbols on the keytops and attach a transparent sheet to the keytops to protect these marks. By contrast, in accordance with the present invention, the keytops can be manufactured merely by being molded directly on a film. As a result, not only is manufacture facilitated, but mass production is expedited, cost is reduced and the keytops can be made much thinner.

As many apparently widely different embodiments the present invention can be made without departing from the spirit and scope thereof, it is to be understood invention is not limited to the specific embodiments thereof except as defined in the appended claims.

What is claimed is:

1. A push-button switch comprising: a fixed contact and a movable contact opposing each other, a resin film extending over said contacts, and a molded one-piece keytop supported by said resin film above the movable contact, said keytop including a protruding keytop portion having a top surface and an outer periphery circumventing said top surface, a film retaining portion provided at the outer periphery of said keytop portion, and a film fixing portion, said resin film having a hole therethrough adjacent the outer periphery of said keytop portion, and said keytop also including a portion extending through said hole in said resin film from said film fixing portion to said film retaining portion, said resin film covering the top surface of said protruding keytop portion, and said resin film extending contiguously from said top surface to a location between said film retaining portion and said film fixing portion, said resin film being sandwiched between and fixed in place at said location by said film retaining portion and said film fixing portion.

2. The push-button switch according to claim 1, wherein a number, symbol or symbol mark is printed on said resin film at a portion thereof covering the top surface of said keytop portion.

* * * * *